(12) United States Patent
Ito et al.

(10) Patent No.: US 11,137,981 B2
(45) Date of Patent: Oct. 5, 2021

(54) OPERATION PROCESSING DEVICE, INFORMATION PROCESSING DEVICE, AND INFORMATION PROCESSING METHOD

(71) Applicant: FUJITSU LIMITED, Kawasaki (JP)

(72) Inventors: Makiko Ito, Kawasaki (JP); Mitsuru Tomono, Higashimurayama (JP); Teruo Ishihara, Sagamihara (JP); Katsuhiro Yoda, Kodaira (JP); Takahiro Notsu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 192 days.

(21) Appl. No.: 16/515,110

(22) Filed: Jul. 18, 2019

(65) Prior Publication Data
US 2019/0339939 A1 Nov. 7, 2019

Related U.S. Application Data

(63) Continuation of application No. PCT/JP2018/000988, filed on Jan. 16, 2018.

(30) Foreign Application Priority Data

Jan. 30, 2017 (JP) .............................. JP2017-014780

(51) Int. Cl.
*G06F 7/483* (2006.01)
*G06F 5/01* (2006.01)
(Continued)

(52) U.S. Cl.
CPC .............. *G06F 7/483* (2013.01); *G06F 5/012* (2013.01); *G06F 7/507* (2013.01); *G06F 17/18* (2013.01); *G06N 7/005* (2013.01)

(58) Field of Classification Search
CPC . G06F 7/483–4876; G06F 7/544–5446; G06F 7/552–556; G06F 17/18;
(Continued)

(56) References Cited

U.S. PATENT DOCUMENTS 10,621,486 B2 * 4/2020 Yao ...................... G06F 7/5443
2015/0120627 A1 4/2015 Hunzinger et al.
(Continued)

FOREIGN PATENT DOCUMENTS

JP 2006-48590 2/2006
JP 2006-155102 6/2006
(Continued)

OTHER PUBLICATIONS

Patterson et al., "Computer Organization and Design: The Hardware/Software Interface", Fifth Edition, Chapter 6.6 pp. 524-530, 2014. Retrieved from <https://ict.iitk.ac.in/wp-content/uploads/CS422-Computer-Architecture-ComputerOrganizationAndDesign5thEdition2014.pdf> (Year: 2014).*
(Continued)

*Primary Examiner* — Aimee Li
*Assistant Examiner* — Carlo Waje
(74) *Attorney, Agent, or Firm* — Fujitsu Patent Center

(57) ABSTRACT

An operation processing device includes: a memory; and a processor coupled to the memory and configured to: acquire statistical information on distribution of bits in fixed point number data after execution of an instruction on the fixed point number data; and update a decimal point position of the fixed point number data.

9 Claims, 37 Drawing Sheets

(51) Int. Cl.
  *G06F 7/507* (2006.01)
  *G06N 7/00* (2006.01)
  *G06F 17/18* (2006.01)

(58) Field of Classification Search
  CPC .............. G06F 7/4991; G06F 7/49921; G06F 7/49936; G06F 7/49942; G06N 3/08; G06N 3/084; G06N 3/04–049; G06N 3/06–0675
  See application file for complete search history.

(56) References Cited

U.S. PATENT DOCUMENTS

| | | | |
|---|---|---|---|
| 2016/0035067 A1 | 2/2016 | Takagi | |
| 2016/0085511 A1 | 3/2016 | Yukiyama et al. | |
| 2017/0061279 A1* | 3/2017 | Yang | G06N 3/084 |
| 2018/0107451 A1* | 4/2018 | Harrer | G06N 3/0454 |
| 2019/0034784 A1* | 1/2019 | Li | G06N 3/0454 |
| 2019/0122106 A1* | 4/2019 | Lee | G06F 7/483 |
| 2020/0125947 A1* | 4/2020 | Park | G06N 3/08 |

FOREIGN PATENT DOCUMENTS

| | | |
|---|---|---|
| JP | 2010-112878 | 5/2010 |
| JP | 2012-203566 | 10/2012 |
| JP | 2016-033754 | 3/2016 |
| JP | 2016-062404 | 4/2016 |
| JP | 2016-539407 | 12/2016 |
| WO | 2015/065729 | 5/2015 |

OTHER PUBLICATIONS

Qiu, Jiantao et al., "Going Deeper with Embedded FPGA Platform for Convolutional Neural Network", Proceedings of the 2016 ACM/SIGDA International Symposium on Field-Programmable Gate Arrays, FPGA'16, pp. 26-35, Jan. 1, 2016.

Extended European Search Report dated Dec. 10, 2019 for corresponding European Patent Application No. 18744586.1, 5 pages.

M. Courbariaux et al., "Training Deep Neural Networks With Low Precision Multiplications", Accepted as a workshop contribution at ICLR 2015, International Conference on Learning Representations (ICLR), arXiv:1412.7024v5 [cs.LG], Sep. 23, 2015, pp. 1-10 (10 pages).

International Search Report, mailed in connection with PCT/JP2018/000988 and dated Apr. 3, 2018 (1 page).

Written Opinion of the International Searching Authority, mailed in connection with PCT/JP2018/000988, and dated Apr. 3, 2018, with partial English translation (7 pages).

I.J. Goodfellow et al., "Maxout Networks", Proceedings of the 30th International Conference on Machine Learning, arXiv:1302.4389v4 [stat.ML], Sep. 20, 2013 (9 pages).

I.J. Goodfellow et al., "Pylearn2: a machine learning research library", arXiv:1308.4214v1 [stat.ML], pp. 1-9, Aug. 20, 2013 (9 pages).

\* cited by examiner

FIG. 2

| FORMAT | Prop. | Up. | PI MNIST | MNIST | DIFAR-10 | SVHN |
|---|---|---|---|---|---|---|
| Goodfellow et al. (2013a) | 32 | 32 | 0.94% | 0.45% | 11.68% | 2.47% |
| Single precision floating point | 32 | 32 | 1.05% | 0.51% | 14.05% | 2.71% |
| Half precision floating point | 16 | 16 | 1.10% | 0.51% | 14.14% | 3.02% |
| Fixed point | 20 | 20 | 1.39% | 0.57% | 15.98% | 2.97% |
| Dynamic fixed point | 10 | 12 | 1.28% | 0.59% | 14.82% | 4.95% |

PRIOR ART THESIS

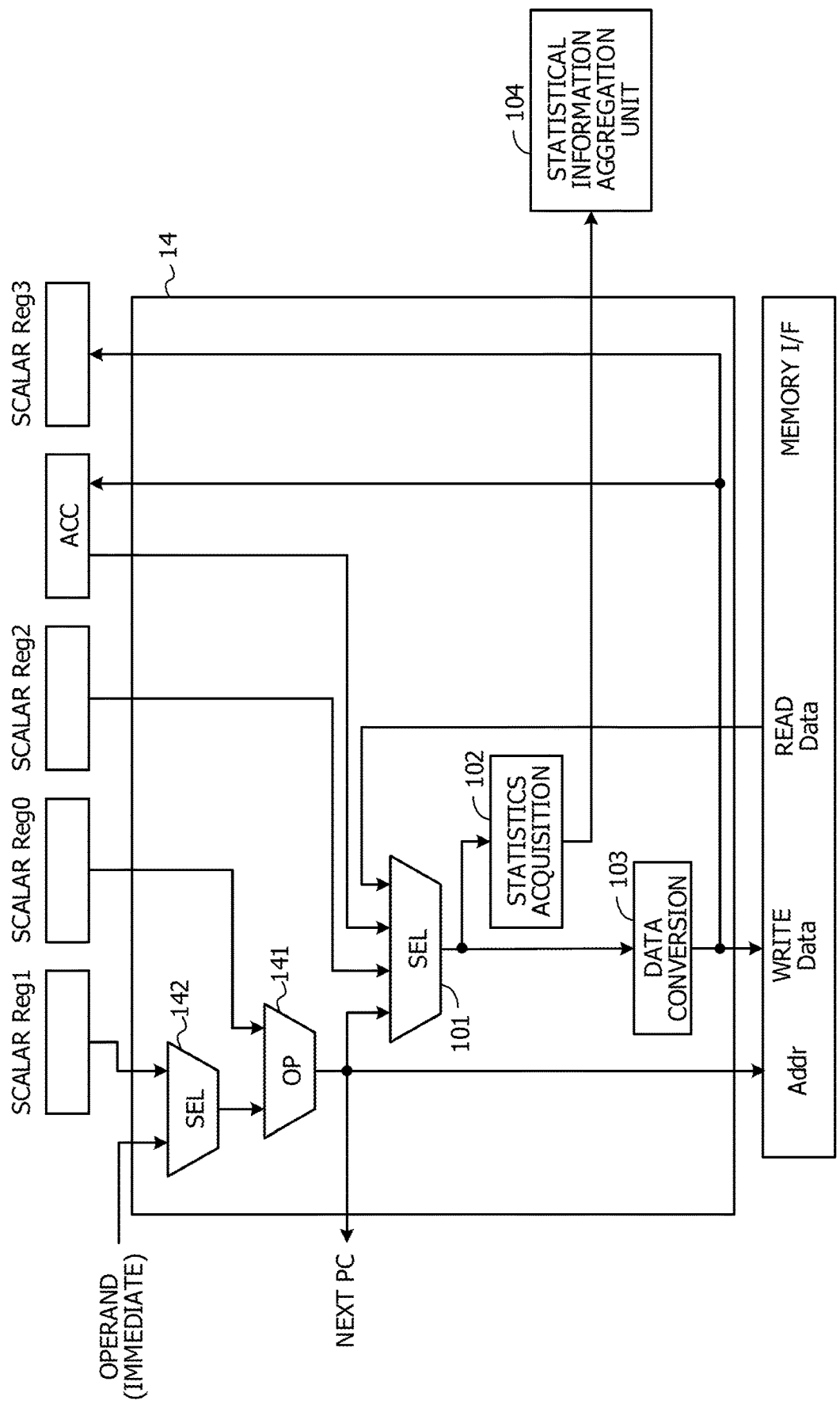

FIG. 13B

| in[39] | in[38] | in[37] | in[36] | ... | in[1] | in[0] | out |
|---|---|---|---|---|---|---|---|
| 0 | 0 | 0 | 0 | ... | 0 | 0 | 0x8000000000 |
| 1 | 1 | 1 | 1 | ... | 1 | 1 | 0x8000000000 |
| 0 | 1 | b | b | ... | b | b | 0x4000000000 |
| 1 | 0 | b | b | ... | b | b | 0x4000000000 |
| 0 | 0 | 1 | b | ... | b | b | 0x2000000000 |
| 1 | 1 | 0 | b | ... | b | b | 0x2000000000 |
| 0 | 0 | 0 | 1 | ... | b | b | 0x1000000000 |
| 1 | 1 | 1 | 0 | ... | b | b | 0x1000000000 |
| ... | ... | ... | ... | ... | ... | ... | ... |
| 0 | 0 | 0 | 0 | ... | 1 | b | 0x0000000002 |
| 1 | 1 | 1 | 1 | ... | 0 | b | 0x0000000002 |
| 0 | 0 | 0 | 0 | ... | 0 | 1 | 0x0000000001 |
| 1 | 1 | 1 | 1 | ... | 1 | 0 | 0x0000000001 |

Header spans: in[39]...in[0] = input; out = output

FIG. 15B

| input | | | | | | | output |
|---|---|---|---|---|---|---|---|
| in[39] | in[38] | in[37] | in[36] | ... | in[1] | in[0] | out |
| 0 | b | b | b | ... | b | 1 | 0x0000000001 |
| 1 | b | b | b | ... | b | 0 | 0x0000000001 |
| 0 | b | b | b | ... | 1 | 0 | 0x0000000002 |
| 1 | b | b | b | ... | 0 | 1 | 0x0000000002 |
| ... | ... | ... | ... | ... | ... | ... | ... |
| 0 | b | b | 1 | ... | 0 | 0 | 0x1000000000 |
| 1 | b | 1 | 0 | ... | 1 | 1 | 0x1000000000 |
| 0 | b | 0 | 0 | ... | 0 | 0 | 0x2000000000 |
| 1 | 1 | 1 | 1 | ... | 1 | 1 | 0x2000000000 |
| 0 | 0 | 0 | 0 | ... | 0 | 0 | 0x4000000000 |
| 1 | 0 | 0 | 1 | ... | 1 | 1 | 0x4000000000 |
| 0 | 0 | 0 | 0 | ... | 0 | 0 | 0x8000000000 |
| 1 | 1 | 1 | 1 | ... | 1 | 1 | 0x8000000000 |

FLG = 0: NOT ACQUIRE STATISTICAL INFORMATION
FLG = 1: ACQUIRE STATISTICAL INFORMATION (IDX IS REGISTER INDEX. HOWEVER, IN CASE OF IDX = 000, STATISTICAL INFORMATION IS NOT ACQUIRED)

OPERATION PROCESSING DEVICE, INFORMATION PROCESSING DEVICE, AND INFORMATION PROCESSING METHOD

CROSS-REFERENCE TO RELATED APPLICATION

This application is a continuation application of International Application PCT/JP2018/000988 filed on Jan. 16, 2018 and designated the U.S., the entire contents of which are incorporated herein by reference. The International Application PCT/JP2018/000988 is based upon and claims the benefit of priority of the prior Japanese Patent Application No. 2017-014780, filed on Jan. 30, 2017, the entire contents of which are incorporated herein by reference.

FIELD

The embodiment relates to an operation processing device, an information processing device including the operation processing device, a method, and a program.

BACKGROUND

Nowadays, the need for deep training is growing. In deep training, various operations including multiplication, product-sum operation, and vector multiplication are performed.

Related art is disclosed in Japanese Laid-open Patent Publication No. 2016-33754, Japanese Laid-open Patent Publication No. 2012-203566, and Japanese Laid-open Patent Publication No. 2010-112878.

Related art is disclosed in Non-Patent Document 1: Courbariaux et al., "TRAINING DEEP NEURAL NETWORKS WITH LOW PRECISION MULTIPLICATIONS" Accepted as a workshop contribution at ICLR 2015, International Conference on Learning Representations(ICLR), Sep. 23, 2015.

SUMMARY

According to an aspect of the embodiments, an operation processing device includes: a memory; and a processor coupled to the memory and configured to: acquire statistical information on distribution of bits in fixed point number data after execution of an instruction on the fixed point number data; and update a decimal point position of the fixed point number data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating a recognition error rate in the case of applying a single precision floating point number, a half precision floating point number, a fixed point number, and a dynamic fixed point number in deep training.

FIG. 11B is a diagram illustrating a configuration of a scalar unit.

FIG. 13B is a diagram illustrating a truth table of a non-sign most significant bit detector.

FIG. 15B is a diagram illustrating a truth table of a non-sign least significant bit detector.

DESCRIPTION OF EMBODIMENTS

For example, in deep training, the requirements for individual operation precision are not as strict as other computer processing. For example, in conventional signal processing or the like, a programmer develops a computer program so as not to generate overflow as much as possible. On the other hand, in deep training, it is acceptable for large values to be saturated to some extent. In deep training, adjustment of coefficients (weights) when performing a convolution operation on a plurality of pieces of input data is the main processing, and among the pieces of input data, extreme data is often not emphasized. Since a large amount of data is repeatedly used to adjust the coefficient, a value that has once been saturated can be reflected in the coefficient adjustment without being saturated by performing digit adjustment in accordance with the progress of training.

Therefore, for reducing the chip area of the operation processing device for deep training and improving the power performance in consideration of such characteristics of deep training, using integer operation using fixed point numbers without using floating point numbers is conceivable. This is because the integer operation can simplify the circuit configuration rather than the floating point number operation.

However, since the fixed point number has a narrow dynamic range, the operation precision may be degraded more than the floating point number. Therefore, also in deep training, consideration is required for the precision of expressing small values, that is, the number of significant digits. For this reason, techniques have been proposed that extend fixed point numbers.

Figure 1:
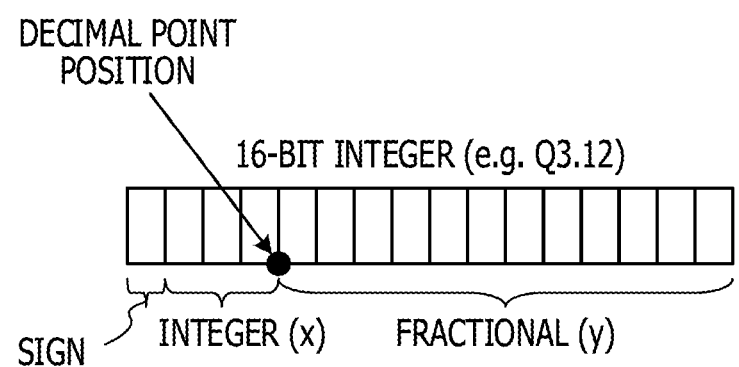
FIG. 1 is a diagram illustrating a Q3.12 format.

For example, in processing with a mixed fixed point, a decimal point position (Q format) suitable for each variable is used instead of using a decimal point position unified for the whole program. FIG. 1 is a diagram illustrating the Q3.12 format. The Q3.12 format defines 16-bit data with one sign bit, three bits for integer parts, and 12 bits after the decimal point. In the mixed fixed point, the decimal point position, that is, the number of digits in the integer part and the number of digits after the decimal point are treated differently for each variable.

As another example, in a dynamic fixed point processing, the range of a variable is acquired during execution, and the decimal point position is reviewed at a fixed timing. Therefore, it can be said that the mixed fixed point operation and the dynamic fixed point operation are operation obtained by adding an aspect of the floating point operation to the fixed point operation which is easier to process than the floating point operation.

Furthermore, a digital signal processor (DSP) having a function for a program to execute processing by the mixed fixed point operation and the dynamic fixed point operation has also been proposed. For example, there is a DSP that executes an operation instruction with block shift specification. An operation instruction with block shift specification executes an operation with a bit width larger than that of the variable, shifts the value from the operation result, cuts the value out, and stores the value in the variable register. In this instruction, the shift amount S (for example, −128 to 127) when cutting out the value from the operation result can be specified by the immediate value/general-purpose register. For example, when the DSP executes the instruction Result=Saturate (((in1 (operator) in2)>>S), 16), the operation result is shifted by S bits, the lower 16 bits are left, and the upper bits are saturated. If S>0, the DSP arithmetically shifts the operation result to the right, that is, embeds the sign bit and shifts the result to the right and deletes the lower bits. On the other hand, if S<0, the DSP arithmetically shifts the operation result to the left, that is, shifts left while maintaining the sign bit, and deletes the lower bit in the complement.

DSPs have also been proposed that perform block count leading sign (BCLS) output. The BCLS output is a function by which the DSP takes the count leading sign of the operation result and writes the result to a register. Here, the count leading sign refers to the position of the positive number most significant bit 1 (the position of the bit 0 that is the negative number and is the most significant). For example, when the DSP executes max (block_count_leading_sign (in1 (operator) in2)−1), the position of the most significant bit 1 of the positive number (the position of the bit 0 that is a negative number and is the most significant) from the operation result by the operator of the variables in1 and in2 is recorded in the register.

FIG. 2 illustrates a recognition error rate in the case of applying a single precision floating point, a half precision floating point, a fixed point, and a dynamic fixed point in deep training (see Non-Patent Document 1). The data in the first row (Goodfellow et al. (2013)) in FIG. 2 are evaluation results of other papers. In the table of FIG. 2, Prop indicates a bit width at the time of data propagation in recognition (forward direction) and training (backward direction). Up. indicates the bit width at the time of weight coefficient update. PI MNIST, MNIST, CIFAR-10, and SVHN indicate data sets used for deep training.

In the processing with the dynamic fixed point number according to Non-Patent Document 1, the presence or absence of overflow is recorded for each operation or variable assignment, and the overflow rate (the number of times of overflowed operations with respect to all operation numbers and number of times of overflowed assignment numbers with respect to the number of all assignment times) is calculated. In this processing, the decimal point position of each variable is changed in the following procedures 1 and 2 every predetermined period.

(Procedure 1) When the overflow rate is larger than the specified value (rmax), the decimal point position is decreased by one.

(Procedure 2) When the double value of the overflow rate is equal to or smaller than the specified value (rmax), the decimal point position is increased by one.

As illustrated in FIG. 2, in the processing according to the prior art, the recognition error rate is not significantly increased even in the results by the single precision floating point number, the half precision floating point number, the fixed point number, and the dynamic fixed point number.

As described above, the recognition error rate does not significantly increase even in the processing result by the dynamic fixed point number in the prior art. However, in the above-described conventional technique, the precision of the training result is degraded because the decimal point position is adjusted by one bit on the basis of the overflow rate. For example, when the decimal point position is adjusted every k pieces of data training, if the decimal point position is shifted n bits from the appropriate position, the training progresses by (n*k) times before the decimal point position is adjusted to the appropriate position. As a result, by the time the decimal point position becomes an appropriate position, data that is saturated or underflows increases, and training may not converge, or the precision of the training result may be degraded.

In one aspect, deep training may be performed with high precision with a fixed point number so as to reduce circuit size and power consumption.

An information processing device according to an embodiment will be described with reference to the drawings. The information processing device performs deep training.

[Example of Execution of Deep Training]

First, deep training in a neural network is illustrated with reference to FIG. 3. The neural network may be a hardware circuit, or may be a virtual network by software connecting between layers virtually constructed on a computer program. The neural network performs, for example, processing in the forward direction for recognizing and identifying an image, and processing in the backward direction for determining parameters used in the processing in the forward direction. The processing in the backward direction is called back propagation (BP).

Figure 3:
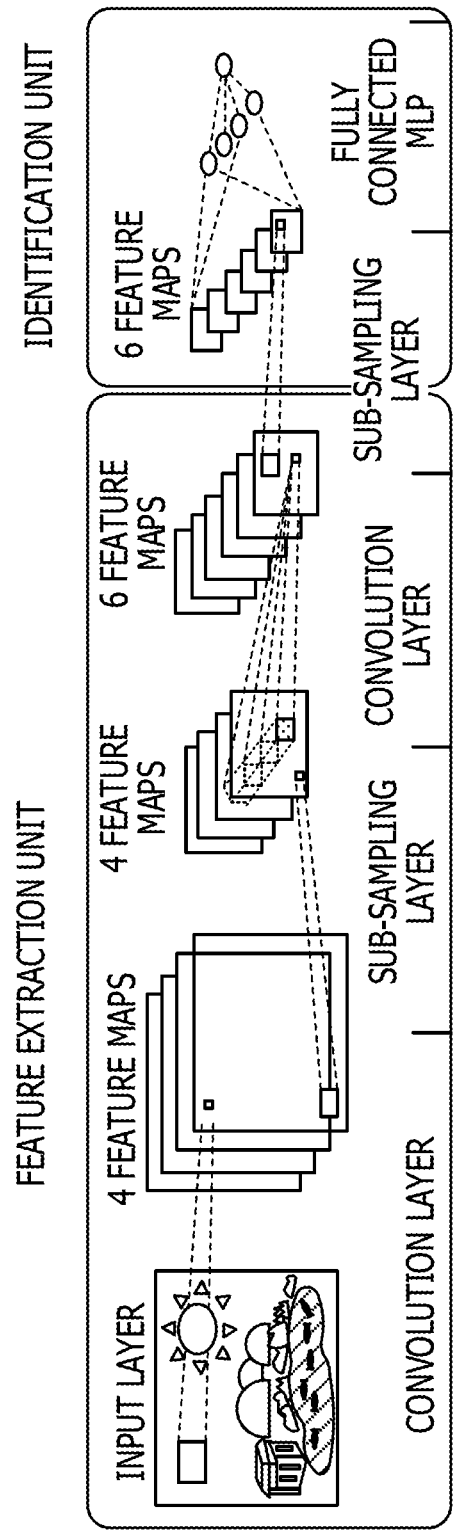
FIG. 3 is a diagram illustrating deep training in a neural network.

The neural network of FIG. 3 performs convolution layer processing and pooling layer processing on an input image to extract image features and identify an image. That is, in FIG. 3, processing in the forward direction is illustrated. In FIG. 3, the processing of the convolution layer and the processing of the pooling layer are performed on the input image which is an input layer, and four feature maps, six feature maps, and the like are sequentially generated. Here, the feature map is, for example, data transmitted/received through different channels of the image, or data corresponding to R, G, B data or the like of the image. The neural network in FIG. 3 outputs the identification result in the fully connected multilayer perceptron (MLP) that is the final layer. The pooling layer is also referred to as a sub-sampling layer. The final layer is also referred to as a fully connected layer.

In the processing in the forward direction, the operation circuit portion in which the processing of the convolution layer up to the final layer and the processing of the pooling layer are repeatedly performed is called a feature extraction unit. That is, the feature extraction unit extracts the thinned-out image by repeatedly performing the process of the convolution layer and the processing of the pooling layer on the input image. The processing of the convolution layer is also called convolution operation. The processing of the pooling layer is also called a pooling operation or a sub-sampling operation.

More specifically, for example, the feature extraction unit performs convolution operation with the filter, m×m weights $w_{ab}$ (a, b=0, . . . , m−1) on information of an image having N×N pixels in a layer (l−1-th layer) in the forward direction. The feature extraction unit performs the convolution operation to create information of the image of the next layer (l-th layer) from the image of the layer (l−1-th layer) currently being processed. The processing result by the convolution operation is converted by the non-linear activation function y=sigma (x), and modeling called firing is performed. The non-linear activation function is, for example, sigma (x)=max (0, x). That is, the nonlinear activation function y=sigma (x) is a function that has a value of sigm(x)=0 when s is a negative value, and sigma (x)=x when x is a positive value. The weight w can also be called a confident because it is used for the convolution operation.

<Convolution Layer Calculation>

Now, the output from a pixel (i, j) in the l−1-th layer is set to $y^{l-1}_{i,j}$, the processing result of the convolution operation on the pixel (i, j) in the l-th layer is set to $x^{l}_{i,j}$, and the operation result of the non-linear activation function y=sigm (x) of the pixel (i, j) in the l-th layer is set to $y^{l}_{i,j}$. $x^{l}_{i,j}$ and $y^{l}_{i,j}$ can be represented by the following (Formula 1) and (Formula 2). However, in (Formula 2), the function sigma is represented by Greek letters.

[Expression 1]

Convolution layer $$x^{l}_{ij} = \sum_{a=0}^{m-1}\sum_{b=0}^{m-1} \omega_{ab} y^{l-1}_{(i+a)(j+b)} \quad \text{(Formula 1)}$$

[Expression 2]

Convolution layer $$y^{l}_{ij} = \sigma(x^{l}_{ij}) \quad \text{(Formula 2)}$$

A region of m×m pixels in the information of the image of the l−1-th layer to be a target of Formula 1 is hereinafter referred to as a unit rectangular region. Note that the unit rectangular region is not limited to one feature map, and the convolution operation may be performed using a plurality of feature maps when four feature maps or six feature maps illustrated in FIG. 1 is subjected to the convolution operation. Hereinafter, a pixel is also referred to as a cell.

The pooling operation is processing of thinning out an image having N×N pixels into an image having N/k×N/k pixels. As a thinning method, for example, processing of dividing N×N pixels into k×k of partial images, and selecting one pixel having the largest pixel value among k×k pixels included in each partial image (hereinafter referred to as max pooling) can be illustrated. As another example, processing of generating one pixel by the average value of k×k pixel can be illustrated.

An identification unit applies a weight to each pixel of all the pixels in the thinned image, and performs a convolution operation to obtain an output value. Now, when the last layer of the feature extraction unit is set to the l−1-th layer, each pixel value of the l−1-th layer is set to $y^{l-1}_{j}$, the convolution operation result by full connection is set to $x^{l}_{i}$, and the weight is set to $w^{l-1}_{ji}$, $x^{l}_{i}$ can be represented by the following (Formula 3).

[Expression 3]

Fully connected layer $$x^{l}_{i} = \sum_{j} w^{l-1}_{ij} y^{l-1}_{j} \quad \text{(Formula 3)}$$

When the operation result of the nonlinear activation function y=sigma(x) in the identification unit is $y^{l}_{i}$, the operation result $y^{l}_{i}$ of the identification unit can be expressed by the following (Formula 4). However, in (Formula 4), the function sigma is represented by Greek letters.

$$y^{l}_{i} = \sigma(x^{l}_{i}) + T^{l}_{i} \quad \text{[Expression 4]}$$

(Formula 4) Fully connected layer

Here, $I^l_i$ is a bias component.

Figure 4:
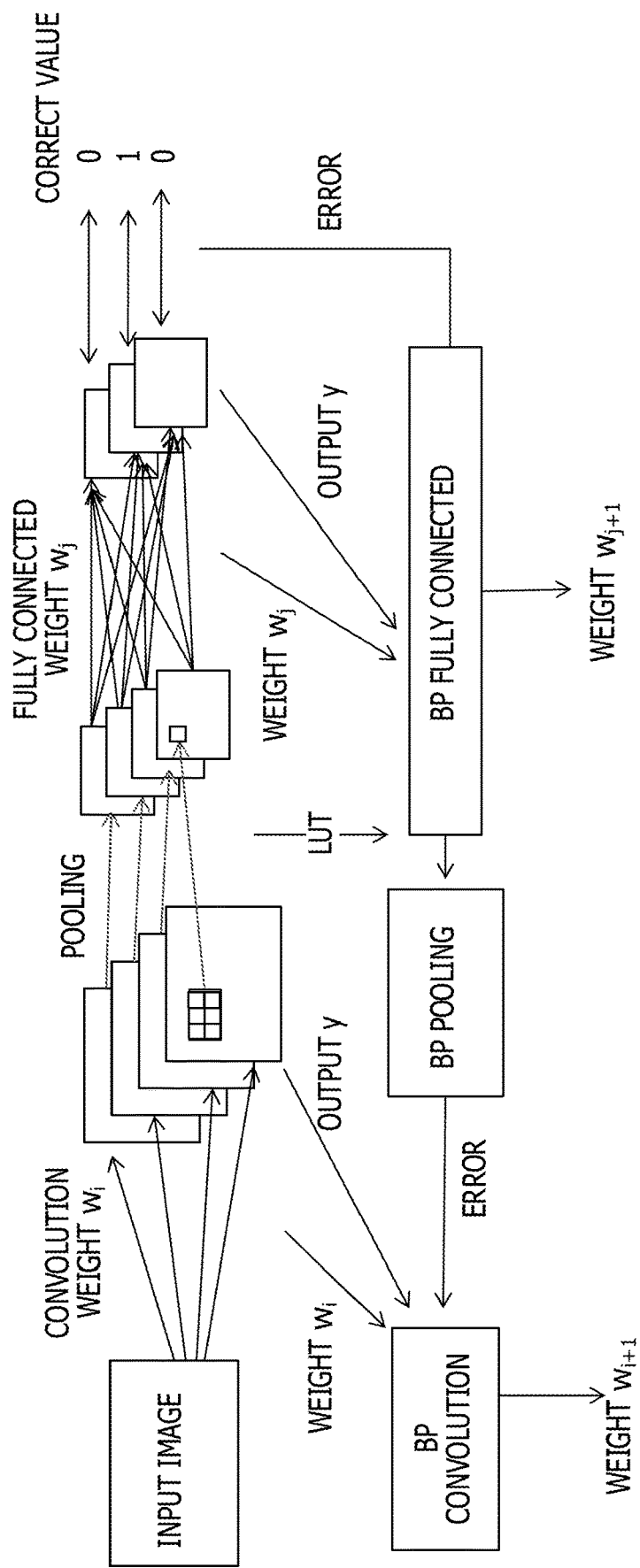
FIG. 4 is a diagram illustrating training processing in a backward direction together with recognition processing and identification processing in the forward direction.

FIG. 4 is a diagram illustrating training processing in a backward direction together with recognition processing and identification processing in the forward direction. Also in the neural network of FIG. 4, the recognition processing in the forward direction is performed by the convolution layer that performs the convolution operation on the input image and the pooling layer that performs thinning processing. The identification processing for outputting the identification result is performed by the fully connected layer (described as fully connected in FIG. 4).

The result of the identification processing by fully connected layers is compared with the correct data, and the difference value which is the comparison result is output as an error. The Error is used in the training processing. The training processing is processing of calculating an error in each of the layers in the convolution layer in the forward direction and the fully connected layer, and the next weight in each layer from the error. In FIG. 4, one weight $w_i$ in the convolution layer (one layer) and one weight $w_j$ in the fully connected layer (one layer) are illustrated as the current weights. Also, as the next weight, one weight $w_{i+1}$ in the convolution layer (one layer) and one weight $w_{j+1}$ in the fully connected layer (one layer) are illustrated.

Now, for example, when the sum of squares of difference values between the output value y, as the identification result and the correct data Ti is exemplified as the evaluation function as an evaluation function of an error, definition as (Formula 5) can be made. The training processing can be considered as processing of determining the weight w for minimizing the error evaluation function exemplified in (Formula 5).

[Expression 5]

$$E = 1/2 \sum_i (T_i - y_i)^2 \quad \text{(Formula 5)}$$

Next, when (Formula 5) is partially differentiated by $y_i$, (Formula 6) is obtained, and the right side is an error value which is a difference between the output value $y_i$ and the correct data Ti. Even when the error evaluation function is generalized from (Expression 5), it is considered that, when the error evaluation function is partially differentiated by the output value $y_i$, an error value that is the difference between the output value $y_i$ and the correct data Ti is obtained.

[Expression 6]

$$\frac{\partial E}{\partial y^L_i} = \frac{d}{dy^L_i} E(y^L) \quad \text{(Formula 6)}$$

Furthermore, when (Formula 5) is partially differentiated with $x_i$, the transition law of (Formula 7) is applied, and Formula 4 is substituted for $y_i$, (Formula 8) is obtained. When the relationship between the pixel value x and the output y of the non-linear activation function is represented by (Expression 2), (Expression 9) is obtained.

[Expression 7]

$$\frac{\partial E}{\partial x_i} = \left(\frac{\partial E}{\partial y_i}\right)\left(\frac{\partial y_i}{\partial x_i}\right) \quad \text{(Formula 7)}$$

[Expression 8]

$$\frac{\partial E}{\partial x^\ell_j} = \sigma'(x^\ell_j) \frac{\partial E}{\partial y^\ell_j} \quad \text{(Formula 8)}$$

[Expression 9]

$$\frac{\partial E}{\partial x^\ell_j} = \frac{\partial E}{\partial y^\ell_j} \frac{\partial y^\ell_{ij}}{\partial x^\ell_j} = \frac{\partial E}{\partial y^\ell_{ij}} \frac{\partial}{\partial x^\ell_{ij}}(\sigma(x^\ell_{ij})) = \frac{\partial E}{\partial y^\ell_{ij}} \sigma'(x^\ell_{ij}) \quad \text{(Formula 9)}$$

On the other hand, when it is considered that (Formula 5) is partially differentiated by $y^l_i$, and the pixel value $x^l_i$ of a fully connected layer is a table as shown by (formula 3) by the output value $y^{l-1}_j$ from the layer on the input side (l−1-th layer), (Formula 10) is obtained. When the pixel value $x^l_{i,j}$ of the first layer is represented by (Formula 1) by the output value $y^{l-1}_j$ from the layer on the input side (l−1-th layer) by one, (Expression 10) changes as (Expression 11).

[Expression 10]

Fully connected layer $$\frac{\partial E}{\partial y^\ell_j} = \sum w^\ell_{ij} \frac{\partial E}{\partial x^{\ell+1}_j} \quad \text{(Formula 10)}$$

[Expression 11]

Convolution layer $$\frac{\partial E}{\partial y^{\ell-1}_{ij}} = \sum_{a=0}^{m-1} \sum_{b=0}^{m-1} \frac{\partial E}{\partial x^\ell_{(i-a)(j-b)}} \frac{\partial x^\ell_{(i-a)(j-b)}}{\partial y^{\ell-1}_{ij}}$$

$$= \sum_{a=0}^{m-1} \sum_{b=0}^{m-1} \frac{\partial E}{\partial x^\ell_{(i-a)(j-b)}} \omega_{ab}$$

$$\frac{\partial x^\ell_{(i-a)(j-b)}}{\partial y^{\ell-1}_{ij}} = \omega_{ab}$$

(Formula 11)

The left side of (Formula 10) indicates an error of the l-th layer. The right side of (Formula 10) is a total of the result of multiplying the error of the l+1-th layer by the variable $w_{i,j}$ of the weight between the pixel i of the l-th layer and the pixel j of the l+1-th layer. This total is the total for the pixel j of the l+1-th layer related to the pixel i of the l-th layer.

When (Formula 5) is partially differentiated with weight $w^l_{ij}$, transitional law is applied, and (Formula 3) is substituted, (Formula 12) is obtained. However, although (Formula 3) is the relationship between the output y from the l-1-th layer and the pixel value x of the l-th layer, (Expression 12) is the relationship between the output y from the first layer and the pixel value x of the l+1-th layer. (Formula 12) shows the gradient of the evaluation function E of an error. In the training processing of the neural network by the maximum gradient descent method, the gradient of the evaluation function E of the error and the amount of change of the product of the training coefficient eta is the weight W (difference value between the current weight Wt and the next weight Wt+1). Therefore, in the following description, the gradient of the error evaluation function E is defined as the update amount deltaW of the weight W. When the relationship between the pixel value x and y is represented by (Formula 1), (Formula 12) changes as (Formula 13). From the above, when the maximum gradient descent method is applied to the error evaluation function E, (Formula 14) is obtained. In (Formula 14), although the operation is repeated M times, M may be 1.

[Expression 12]

Fully connected layer $$\frac{\partial E}{\partial w_{ij}^\ell} = y_i^\ell \frac{\partial E}{\partial x_j^{\ell+1}} \quad \text{(Formula 12)}$$

[Expression 13]

Convolution layer $$\frac{\partial E}{\partial \omega_{ab}} = \sum_{i=0}^{N-m}\sum_{j=0}^{N-m} \frac{\partial E}{\partial x_{ij}^\ell} \frac{\partial x_{ij}^\ell}{\partial \omega_{ab}} \quad \text{(Formula 13)}$$

$$= \sum_{i=0}^{N-m}\sum_{j=0}^{N-m} \frac{\partial E}{\partial x_{ij}^\ell} y_{(i+a)(j+b)}^{\ell-1}$$

[Expression 14]

$$W_{t+1} = W_t + \frac{\eta}{|M|}\sum_{m=1}^{M}\frac{\partial E}{\partial w_t} \quad \text{(Formula 14)}$$

(A) Weight of Each Layer (Formula 14) shows the relationship between the current weight Wt and the weight Wt+1 in the next recognition processing. Therefore, the second term of the right side of (Formula 14) is the incremental value to the next weight. The Greek letter eta in (Formula 14) is a coefficient for obtaining an incremental value of the weight Wt from the gradient of the evaluation function E of an error, and can be set empirically and experimentally, for example. That is, in the training processing, the gradient according to (Formula 12) (or Formula 13) is obtained in each layer of the training circuit, and the incremental value of the second term of (Formula 14) is calculated in a direction in which the error evaluation function E becomes small, and processing of obtaining the next weight Wt+1 for the next time is performed.

(B) Gradient of Error Evaluation Function of Each Layer (Calculation of Update Amount deltaW)

Here, the second term of (Formula 14) is obtained from the product of the pixel value ($y^l_i$) of each layer (l-th layer), and the error of the layer (l+1-th layer) on the output side by one with respect to each layer (l-th layer) (the partial differential value by the pixel value $x^{l+1}_j$ of the evaluation function of the error) according to (Formula 12). However, when the relationship between the current layer (l−1-th layer in (Formula 13)) and the layer on the one-layer fully connected layer side (l-th layer in (Formula 13) is represented by product-sum operation as (Formula 1), the update amount deltaW is represented by (Formula 13). That is, the update amount deltaW is the total of the contribution to the error from the pixel value $x^l_{i,j}$ of the l-th layer related to the output value $y^{l-1}_{i,j}$ of the pixel of the current layer (l−1-th layer).

(C) Errors in Each Layer

On the other hand, the left side of (Formula 10) indicates an error (a partial differential value by a pixel value $y^l_i$ of an evaluation function of the error) of each layer (l-th layer). The right side of (Formula 10) is a total of a product of an error of the layer on the output side by one (l+1-th layer) with respect to the current layer (l-th layer) (a partial differential value by the pixel value $x^{l+1}_j$ of the error evaluation function) and the variable wi,j of the weight between the pixel i in the l-th layer and the pixel j in the l+1-th layer. This total is the total for the pixel j of the l+1-th layer related to the pixel i of the l-th layer.

Comparative Example

Deep training in the information processing device according to the comparative example will be described with reference to FIGS. 5 to 7.

Figure 5:
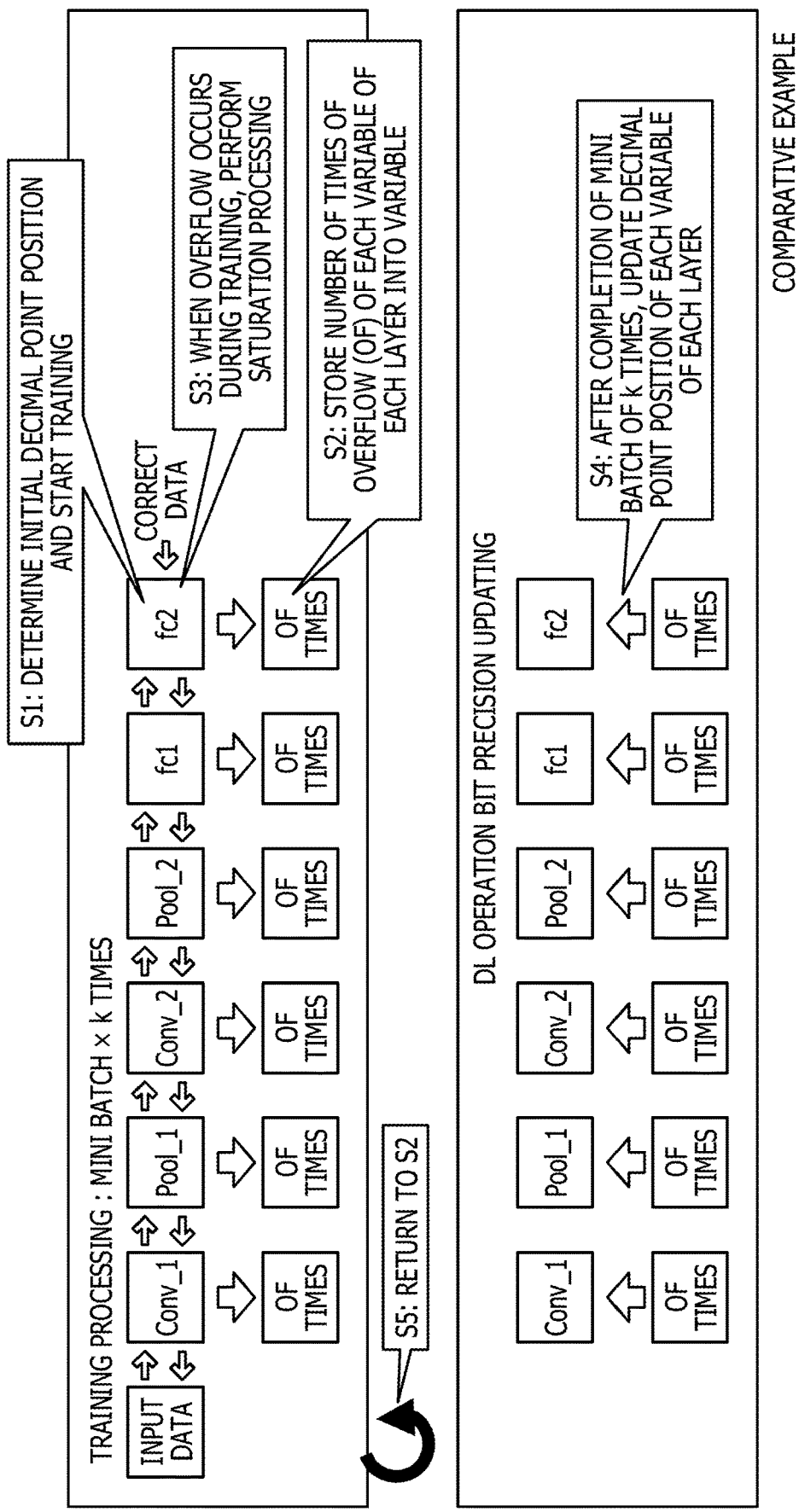
FIG. 5 is a diagram illustrating a deep training procedure according to a comparative example.

FIG. 5 is a diagram illustrating a deep training procedure according to the comparative example. The information processing device of the comparative example performs deep training in accordance with a computer program. The information processing device of the comparative example includes a processor capable of executing the process of the dynamic fixed point number.

As illustrated in FIG. 5, the deep training of the comparative example is performed by processing of the first convolution layer (Conv_1) and the pooling layer (Pool_1), the second convolution layer (Conv_2) and the pooling layer (Pool_2), the fully connected layer 1 (fc1), and the fully connected layer 2 (fc2). The deep training is performed divided into processing units called mini-batches. Here, the mini-batch is a combination of k pieces of data obtained by dividing a set of input data to be learned {(Ini, Ti), i=1 to N} into plural sets (for example, M sets of k pieces of data, N=k*M). Also, the mini-batch refers to a processing unit of training that is performed on such individual input data sets (k pieces of data). Here, Ini is input data (vector) and TI is correct data (vector). As described below, the information processing device of the comparative example acquires the number of times of overflow of each variable of each layer for each predetermined number of mini-batches during deep training, accumulates them in variables in the computer program, and automatically adjusts the fixed point position of the variable to be used in the deep training.

The information processing device of the comparative example, for example, determines the initial decimal point position of each variable by trial (for example, one time of mini-batch) with a floating point number or user specification, and starts training (S1). Then, while training mini-batches of k times, the information processing device stores the number of times of overflow of each variable of each layer as statistical information (S2). At this time, the information processing device determines the presence or absence of overflow, counts the number of times, and substitutes the number into a counter variable that holds the number of times, each time an operation, assignment, or the like is performed on each variable in a program that executes training.

If overflow occurs in the variable while training the mini-batch, saturation processing is performed on the variable and the training is continued (S3). Here, the saturation processing is processing for dipping to a positive maximum value when a positive number overflows and to a negative minimum value when a negative number overflows.

Then, the information processing device obtains an overflow rate from the number of times of overflow accumulated in the counter variable after the mini-batch for k sets of data ends (after training of k times ends), and the decimal point position of the fixed point number is adjusted based on the overflow rate (S4). Then, the information processing device returns to the processing of S2 to advance training.

Figure 6:
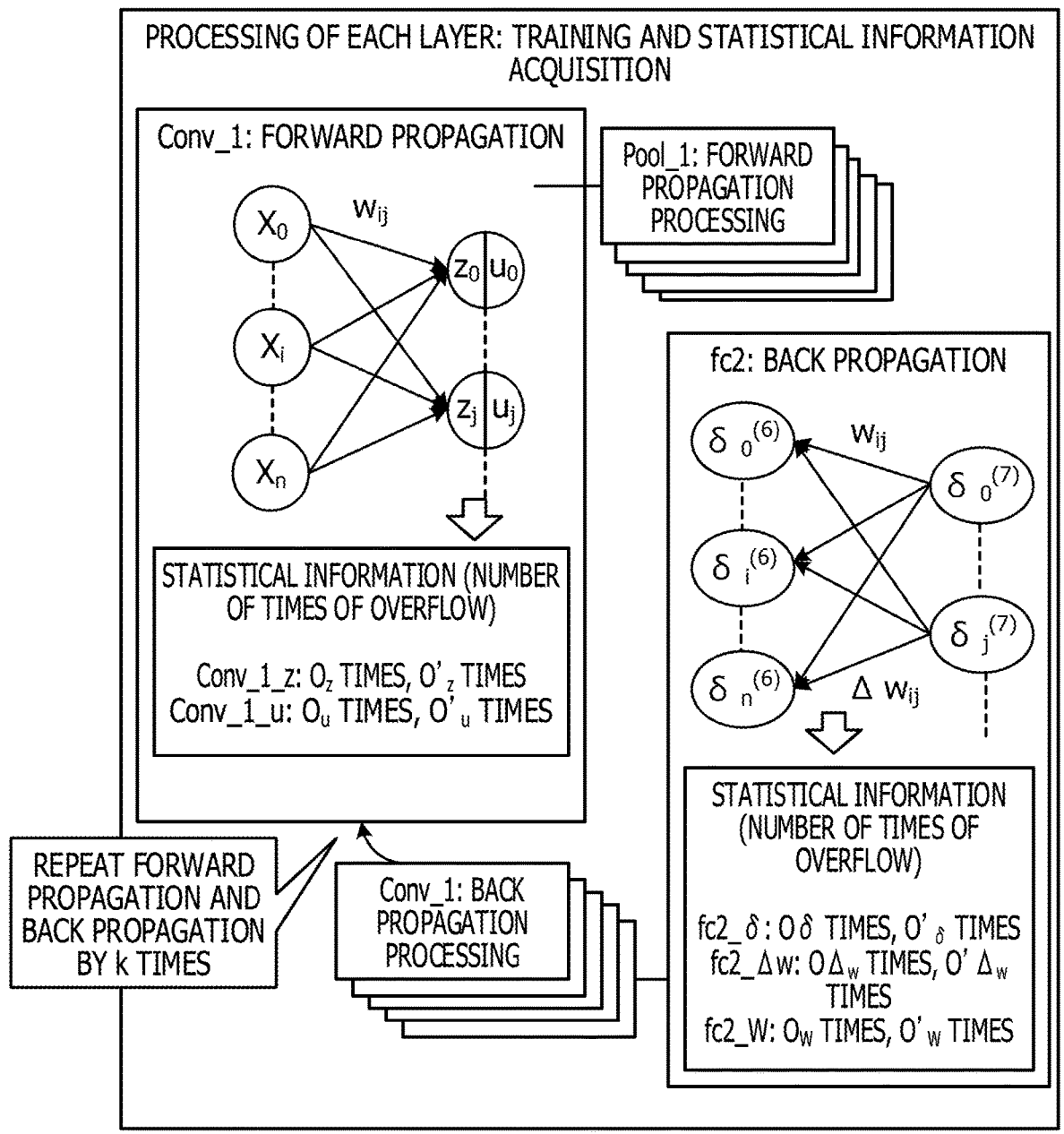
FIG. 6 is a diagram illustrating the details of processing of each layer.

FIG. 6 is a diagram illustrating the details of processing of each layer in FIG. 5. In the drawing, a first convolution layer (Conv_1), a pooling layer (Pool_1), and a fully connected layer 2 (fc2) are illustrated. In this example, in the first convolution layer (Conv_1), convolution operation is performed between the input data ini=(x0, . . . , xn) and the weight (Wij), and z0, . . . , zj, . . . are calculated. Further, activation functions are operated for z0, . . . , zj, . . . or the like, and u0, . . . , uj, . . . or the like are calculated. The information processing device accumulates the number of times of overflow of the variables z0, . . . , zj, . . . in the first convolution layer (Conv_1) in the counter variable Conv_1_z. The information processing device accumulates the number of times of overflow in the variables u0, . . . , uj, . . . or the like in the first convolution layer (Conv_1) in the counter variable Conv_1_u. For example, when the counter variable Conv_1_u is an array, the number of overflowed variables among the variables u0, . . . , uj, . . . is accumulated in the counter variable Conv_1_u (1). Further, in the counter variable Conv_1_u (2), among the variables u0, . . . , uj, . . . , the number of variables that overflows when being doubled is accumulated.

The operation result in the first convolution layer (Conv_1) is further propagated from the first pooling layer (Pool_1) to the upper layer. At this time, the information processing device performs similar operation and accumulation of the number of times of overflow in the second and higher layers. The information processing device performs the above-described operation also in the upper layer to further propagate the operation result to the upper layer. Then, the information processing device finally generates an error $\delta 0^{(7)}, \ldots, \delta j^{(7)}$ from the difference value between the operation result obtained and the correct data Ti and propagates the difference value to the fully connected layer 2 (fc2). Then, the information processing device performs propagation in the back direction based on the errors $\delta 0^{(7)}, \ldots, \delta j^{(7)}, \ldots$. As a result, the information processing device generates the difference value $\Delta$Wij to the next weight between errors $\delta 0^{(6)}, \ldots, \delta j^{(6)}, \ldots \delta n^{(6)}$ at the output of the lower layer (for example, the connected layer 1(fc1)) and the variable Wij of the weight. At this time, the information processing device accumulates errors $\delta 0^{(7)}, \ldots, \delta j^{(7)}, \ldots$ and errors $\delta 0^{(6)}, \ldots, \delta j^{(6)}, \ldots, \delta n^{(6)}$ in the counter variable fc2_$\delta$. The information processing device also accumulates the number of times of overflow in the difference value $\Delta$Wij in the counter variable fc2_$\Delta$W. The information processing device also accumulates the number of times of overflow in the variable Wij of the weight in the counter variable fc2_W.

Then, the information processing device calculates the difference in weight while propagating the error in the back method from the fully connected layer 1 (fc1) to the first convolution layer (Conv_1). The information processing device repeats k times of forward propagation and back propagation as described above using k sets of input data. The information processing device updates the fixed point position of each variable based on the number of times of overflow of the counter variable corresponding to each variable after the k mini-batches are finished.

Figure 7:
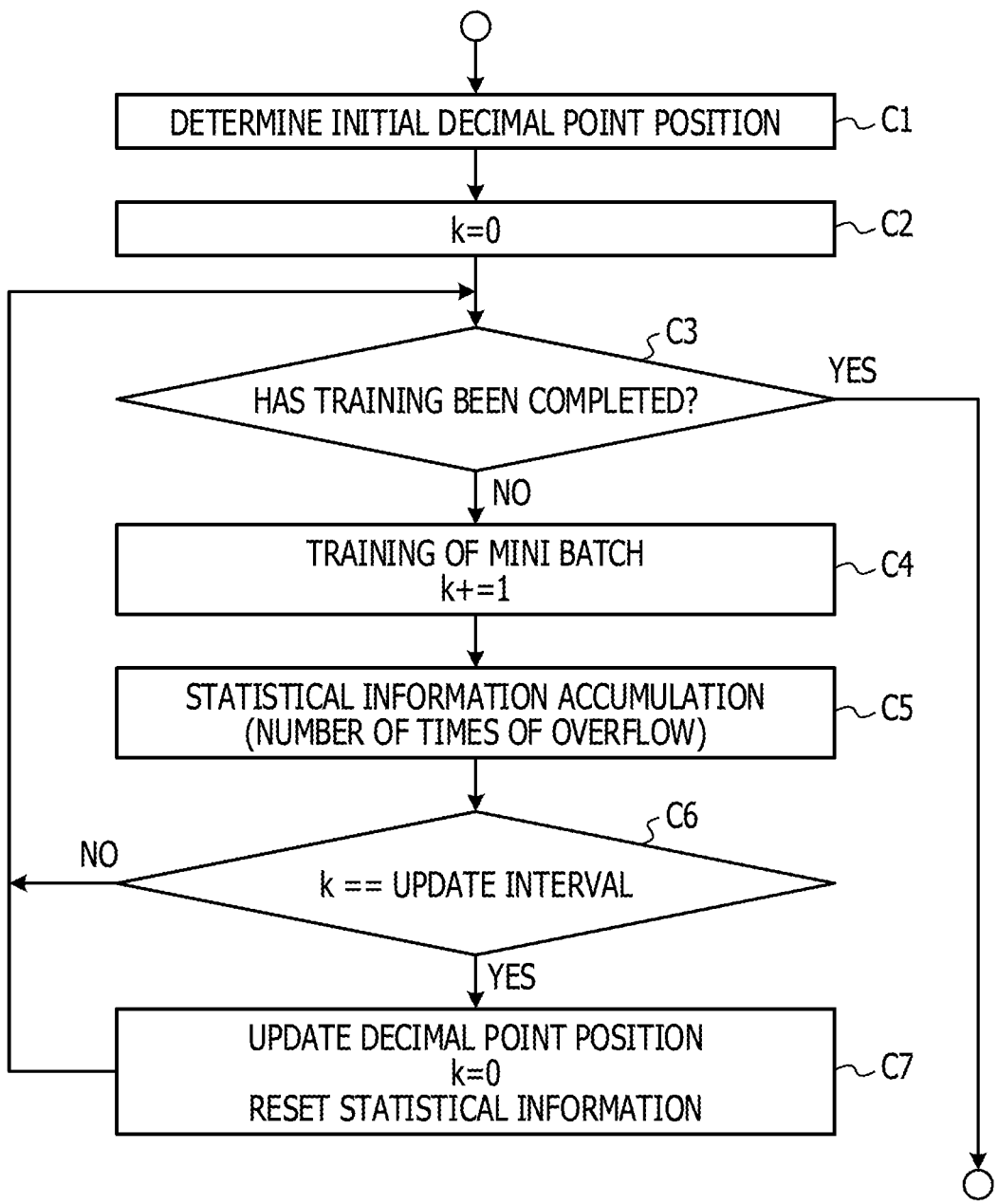
FIG. 7 is a diagram illustrating a flowchart of training processing by an information processing device of the comparative example.

FIG. 7 illustrates a flowchart of training process by the information processing device of the comparative example. In this process, the information processing device determines an initial decimal point position (C1). Then, the information processing device initializes the number k with the value κ. Then, the information processing device determines whether the condition for the end of training is satisfied (C3). The training ends when the error falls below a reference value or when the number of trainings reaches a prescribed maximum value.

If the condition for the end of training is not satisfied, the information processing device executes the next mini-batch and counts up the variable k (C4). Then, the information processing device accumulates the number of times of overflow as statistical information in each counter variable (C5). That is, in each layer, the information processing device accumulates the number of overflowed variables, and the number of overflowed variables when doubled.

Then, the information processing device determines whether the number k has reached the update interval (C6). If the number k has not reached the update interval, the information processing device returns to the process of C3. On the other hand, when the number k reaches the update interval, the information processing device updates the decimal point position in accordance with the number of times of overflow of the variable. For example, as in Non-Patent Document 1, the information processing device may obtain an overflow rate obtained by dividing the number of times of overflow by the number of executions of the operation. Then, when the overflow rate exceeds the specified value, the information processing device may lower the decimal point position of the corresponding variable by one and extend the integer part by one bit. If the value twice the overflow rate is less than or equal to the specified value, the information processing device may increase the decimal point position by one and reduce the integer part by one bit. Then, the information processing device 1 returns to the process of C3.

However, the above processing is processing of accumulating the number of times of overflow for each operation of each layer, and shifting the decimal point position by one bit, if the overflow rate exceeds the default value, and if the value twice as large as the overflow rate becomes less than the default value. This processing is processing of updating the fixed point position based on the number of times of overflow or the overflow rate. It is difficult for the information processing device to determine where the proper decimal point position is from the number of times of overflow or the overflow rate.

Therefore, in the process of the comparative example, when updating the fixed point position, an appropriate position is tried by processing such as decreasing or increasing the integer part length by one, and the determination is repeated from the result. Therefore, the decimal point position is updated a plurality of times before the information processing device determines the proper decimal point position. For example, as described above, when the information processing device determines the overflow rate every k mini-batches and updates the decimal point position one bit at a time, N*k times (* is multiplication) mini-batches are executed to move the decimal point position by N bits. Therefore, the training processing is repeated with the decimal point position being inappropriate. That is, during training, saturation or underflow of fixed point number data occurs at an undesirable level, which may lead to deterioration in the precision of training results, and convergence may be delayed.

In addition, the information processing device of the comparative example may simply acquire the number of times of overflow and execute the process of accumulating in the deep training program, which may increase the training time. That is, since the information processing device does not have a function of providing the program with information for determining an appropriate decimal point position, a code for accumulating the number of times of overflow is incorporated in the program, which may increase processing time.

Fourth Embodiment

The information processing device 1 according to an embodiment, an information processing method executed by the information processing device 1, and a program executed by the information processing device 1 will be described below with reference to FIGS. 8A to 32. The present embodiment is an example, and the information processing device 1 is not limited to the configuration of the present embodiment.

<Statistics>

In the present embodiment, when the processor of the information processing device 1 acquires statistical information, overhead in a program for acquiring statistical information is reduced. Here, the statistical information acquired by the processor refers to, for example, any one of the following, or a combination thereof. The application program executed by the information processing device 1 optimizes the decimal point position by acquiring statistical information from the processor. According to the processing of the application program, the processor executes an instruction for the Dynamic Fixed Point operation.

(1) Distribution of the Most Significant Bit Position that is not Signed

Figure 8A:
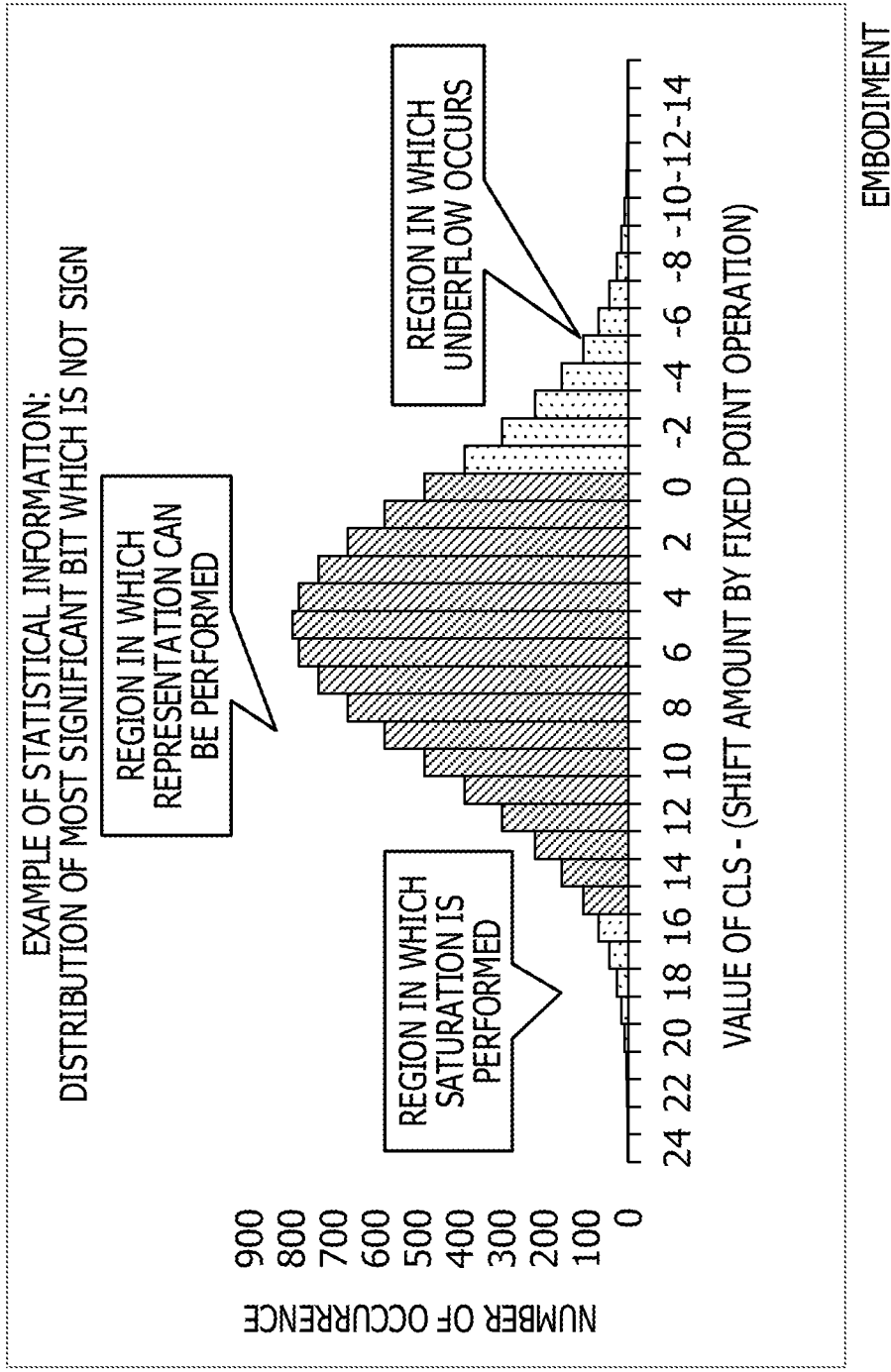
FIG. 8A is a diagram illustrating distribution data of the most significant bit position which is not a sign.

FIG. 8A exemplifies distribution data of the most significant bit position that is not a sign. FIG. 8A is an example for data in which the intermediate result of the operation is 40 bits and right-shifted by 14 bits for digit alignment of fixed-point numbers. The most significant bit position that is not sign means the most significant bit position where the bit is 1 for a positive number. Also, for negative numbers, it means the most significant bit position, which is bit 0. The position of the most significant bit that is not a sign is, for example, the position in which the index k is the largest among bits [k] different from the sign bit bit[39] when the bit sequence is changed from the most significant bit bit[39] to the least significant bit bit[0]. When the distribution of the most significant bit position which is non-sign is obtained, the distribution range of the value as an absolute value can be grasped.

In FIG. 8A, the vertical axis is the number of occurrences of the most significant bit position that is not sign, and the horizontal axis is the most significant bit position Count Leading Sign (CLS). In FIG. 8A, it is assumed that there is a decimal point to the right of bit 0. In the present embodiment, the operation circuit of the processor of the information processing device 1 and the registers in the operation circuit have a bit width (for example, 40 bits) equal to or greater than the number of bits (for example, 16 bits) of the register specified by the instruction operand. However, the bit width of the operation circuit of the processor of the information processing device 1 and the register in the operation circuit is not limited to 40 bits. In addition, the operation result is stored in a register (a register specified by an instruction operand) having a bit width smaller than that of the operation circuit, such as a 16-bit register, for example. As a result, the operation result (for example, 40 bits) is shifted by the shift amount designated by the operand, and the bit corresponding to less than bit 0 is subjected to predetermined rounding processing and data that exceeds the bit width of the register designated by the operand (data above bit 15) is saturated.

Moreover, the numerical value given to the horizontal axis of FIG. 8A shows the numerical value which can be represented by a fixed point. For example, when the information processing device 1 moves 2 bits to the right, the most significant bit is moved to the position 14 and the region in which saturation is performed is expanded by 2 bits, and the region in which underflow occurs to be 0 is reduced by 2 bits. That is, when the information processing device 1 shifts the decimal point position to the left by 2 bits, the region in which saturation is performed is expanded by 2 bits, and the region in which the underflow occurs is reduced by 2 bits. Also, for example, when the information processing device shifts this fixed point number by 2 bits in the positive direction (shifts 2 bits in the left direction), the most significant bit shifts to 18 positions, and the region in which saturation is performed decreases by 2 bits, and the region in which the underflow occurs is expanded by 2 bits. That is, when the information processing device 1 shifts the decimal point position to the right by 2 bits, the region in which saturation is performed is reduced by 2 bits, and the region in which the underflow occurs is expanded by 2 bits.

The information processing device 1 can immediately determine the appropriate shift amount in the dynamic fixed point operation, that is, the appropriate fixed-point position, by obtaining the distribution of the positions of the most significant bits that are not signs during training. For example, the information processing device 1 may determine the fixed point position so that the data to be saturated is equal to or less than the designated ratio. That is, as an example, the information processing device 1 can determine the fixed point position prior to the data saturation becoming a predetermined degree rather than the data underflow becoming a predetermined degree.

The distribution of the most significant bit positions which are non-signs is integrated in a predetermined register (also referred to as a statistical information register) in the processor 10 (see FIG. 9) of the information processing device 1. The processor 10 executes instructions such as reading and writing of distribution data from the statistical information register and clearing of the statistical information register. Therefore, in the statistical information register, distribution data of one or more fixed point numbers targeted for instruction execution from the previous execution of the clear instruction to the present is accumulated. The stored distribution data is read into the memory by a read command. The processor 10 may execute a load instruction to the statistical information register instead of the clear instruction, and may load the value 0 to the statistical information register.

(2) Distribution of the Least Significant Bit Position that is not Signed

Figure 8B:
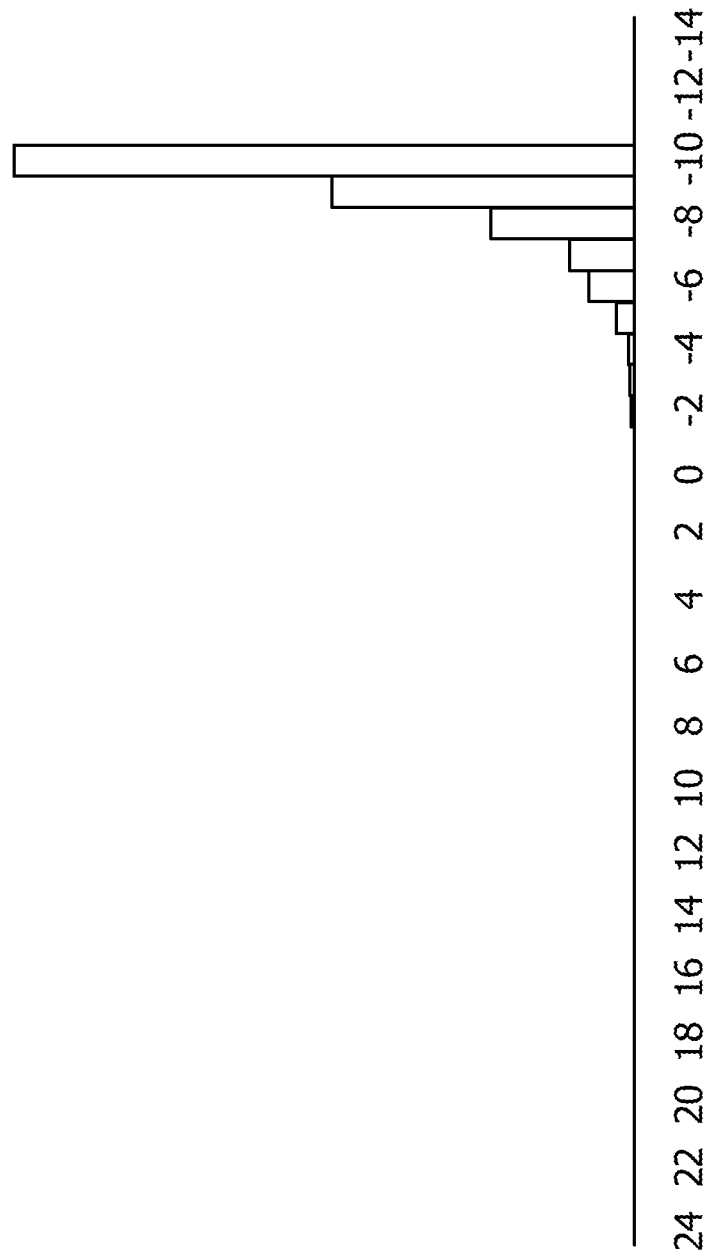
FIG. 8B is a diagram illustrating distribution data of the least significant bit position which is not a sign.

The distribution of the least significant bit positions that are not signed means the least significant bit positions where the bits have different values from the signs. For example, when the bit sequence is a sequence from the most significant bit bit [39] to the least significant bit bit [0], the distribution of the least significant bit positions is the distribution in which the index k is the smallest among the bits [k] different from the sign bit bit [39]. The distribution of the least significant bit positions that are not signs is represented as illustrated in FIG. 8B. Further, in the distribution of the least significant bit position that is not a sign, the least significant bit including valid data is grasped.

(3) Maximum Value of the Most Significant Bit Position that is not Signed

The maximum value of the most significant bit position that is not signed is the largest value of the most significant bit positions that is a value different from the value of the sign bit for one or more fixed point numbers targeted for instruction execution from the time when the clear instruction was executed to the present. The information processing device 1 can use the maximum value of the position of the most significant bit that is not a sign to determine an appropriate shift amount in the dynamic fixed point operation, that is, an appropriate decimal point position.

The processor executes instructions such as reading the maximum value from the statistical information register, clearing the statistical information register, and the like. Therefore, the maximum value from the previous execution of the clear instruction to the present is accumulated in the statistical information register, and the maximum value is read out to the memory by the read instruction.

(4) Minimum Value of the Least Significant Bit Position that is not Signed

The smallest value of the least significant bit position that is not signed is the smallest value of the least significant bit positions that is different from the sign for one or more fixed point numbers from the time when the clear command was executed to the present. The information processing device 1 can use the minimum value of the position of the least significant bit that is not a sign to determine an appropriate shift amount in the dynamic fixed point operation, that is, an appropriate decimal point position.

The processor 10 executes instructions such as reading and clearing of the minimum value from the statistical information register. Therefore, the minimum value from the execution of the previous clear instruction to the present is accumulated in the statistical information register, and read out to the memory by the read instruction.

<Configuration>

Figure 9:
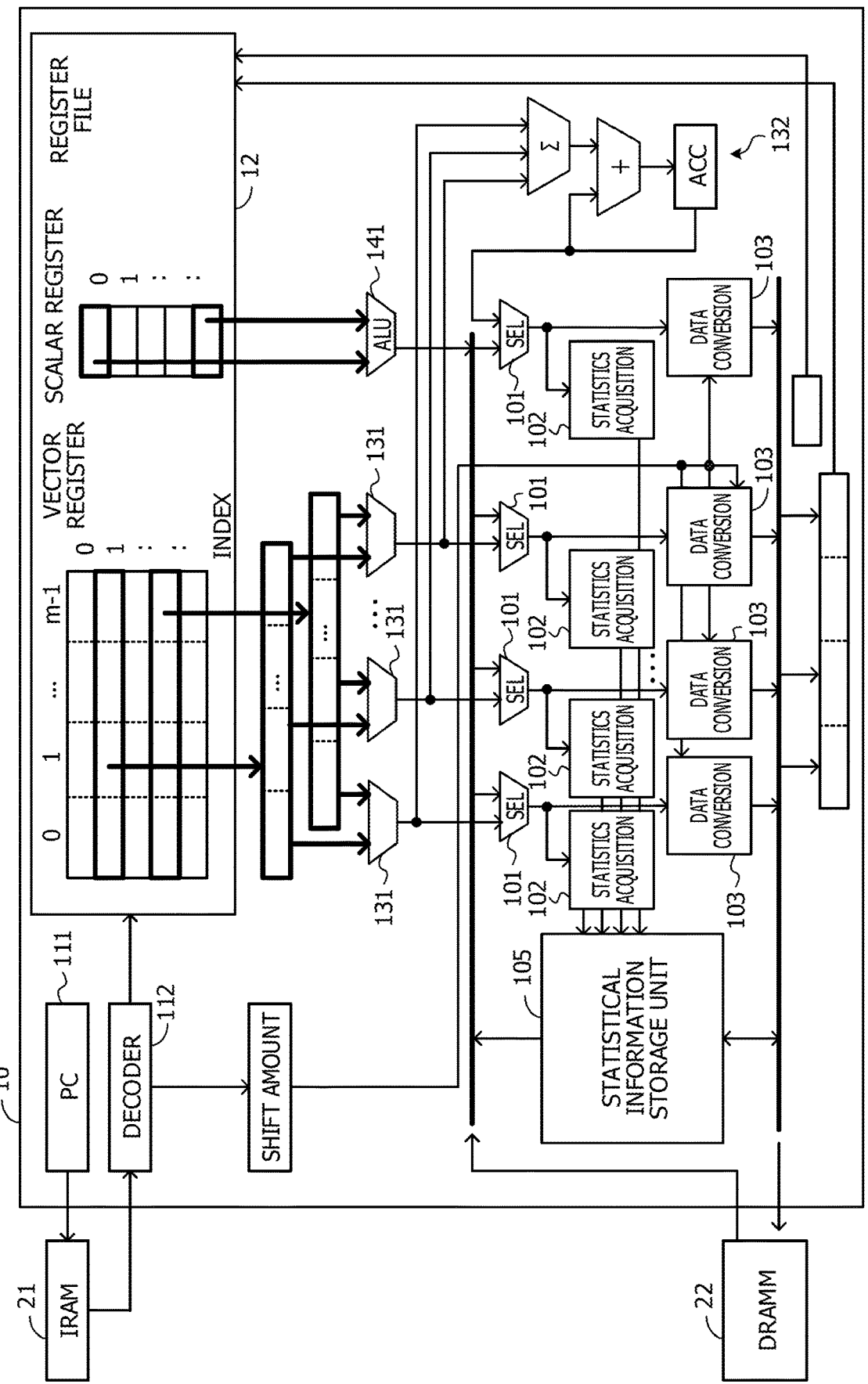
FIG. 9 is a diagram illustrating a configuration of a processor.

FIG. 9 illustrates the configuration of the processor 10 of the information processing device 1. In FIG. 9, an instruction memory (IRAM) 21 and a data memory (DRAM) 22 are illustrated as well as the processor 10. The processor 10 is a single instruction multiple data (SIMD) type operation processing device.

The processor 10 includes a program counter (PC) 111, a decoder (Decoder) 112, a register file 12, an operator 131 for vector operation, an operator for scalar operator (arithmetic logic unit (ALU)) 141, and an accumulator 132 that adds the result of the operator 131 for vector operation. Further, the processor 10 has a plurality of selectors 101 for selecting the operation results of the operator 131 for vector operation, the operator 141 for scalar operation, the accumulator 132, and the like, and the read result from the data memory 22. In the drawing, a plurality of selectors are generically called a selector 101. Also, a plurality of computing units for vector operation are generically called an operator 131.

Furthermore, the processor 10 has a statistical information acquisition unit 102 that acquires statistical information from data selected by the selector 101, and a statistical information storage unit 105 that stores statistical information acquired by the statistical information acquisition unit 102. The statistical information acquisition unit 102 and the statistical information storage unit 105 are an example of an acquisition circuit that acquires statistical information on the distribution of bits in fixed-point number data after execution of an instruction on fixed-point number data. In the figure, a plurality of statistical information acquisition units are collectively referred to as a statistical information acquisition unit 102.

Furthermore, the processor 10 has a data conversion unit 103 that changes the fixed point position of the data selected by the selector 101. Also, in the figure, a plurality of data conversion units are generically called a data conversion unit 103.

As illustrated in the figure, the instruction is fetched from the address of the instruction memory 21 pointed to by the program counter 111, and the decoder 112 decodes the fetched instruction. In the figure, the control unit for instruction fetch that executes instruction fetch is omitted.

When the decoder 112 decodes an instruction, each unit of the processor 10 is controlled according to the decoding result. For example, when the result of decoding is a vector operation instruction, data of the vector register of the register file 12 is input to the operator 131 for vector operation, and the vector operation is executed. The operation result of the operator 131 for vector operation is supplied to the statistical information acquisition unit 102 and the data conversion unit 103 via the selector 101. Further, the operation result of the operator 131 for vector operation is input to the accumulator 132, and the operation result of the operator 131 for vector operation is added, for example, in a cascade. The operation result of the accumulator 132 is supplied to the statistical information acquisition unit 102 and the data conversion unit 103 via the selector 101.

Also, for example, when the instruction is a scalar operation instruction as a result of decoding, the data of the scalar register of the register file 12 is input to the operator 141 for scalar operation. As similar to the operation result of the accumulator 132, the operation result of the operator 141 is supplied to the statistical information acquisition unit 102 and the data conversion unit 103 through the selector 101.

Furthermore, for example, when the instruction is a load instruction as a result of decoding, data is read from the data memory 22 and supplied to the statistical information acquisition unit 102 and the data conversion unit 103 via the selector 101. The result of data conversion by the data conversion unit 103 is stored in the register of the register file 12.

Also, as a result of decoding, if the instruction is an instruction to execute a Dynamic Fixed Point operation, the decoder 112 instructs the data conversion unit 103 to be supplied with the shift amount. The shift amount is acquired from, for example, the operand (immediate value) of the instruction, the register designated by the operand, the data memory 22 of the address indicated by the address register designated by the operand, and the like, and is supplied to the data conversion unit 103. The process of FIG. 9 is an example of the decoder acquiring designation (shift amount) of the decimal point position of the fixed point number data occur from the instruction.

Figure 12:
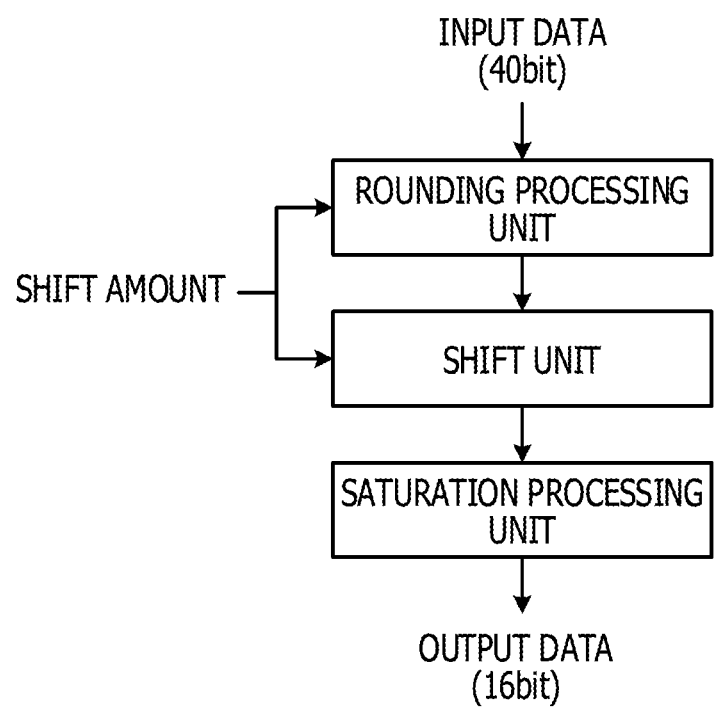
FIG. 12 is a diagram illustrating a configuration of a data conversion unit.

The data conversion unit 103 shifts fixed point number data obtained by a result of vector operation, a result of scalar operation, a result of operation of the accumulator 132, or a result of reading from the data memory 22, by designated shift amount S. In addition, the data conversion unit 103 performs saturation processing of the upper bits and rounding of the lower bits along with the shift. FIG. 12 illustrates a specific configuration of the data conversion unit. The data conversion unit 103 includes, for example, a rounding processing unit that considers an input as an operation result of 40 bit and performs input rounding with a low-order S bit as a fractional part, a shifter that performs arithmetic shift, and a saturation processing unit that performs saturation processing.

The rounding unit rounds the lower S bits as a fractional part. If S is negative, the rounding unit does nothing. Examples of rounding include nearest round, round to 0, round to positive infinity, round to negative infinity, and stochastic round. The shift amount in the figure is, for example, a shift amount obtained by the decoder from the instruction as illustrated in FIG. 9.

The shift unit performs S bit arithmetic right shift when S is positive, and arithmetic left shift when S is negative, that is, −S bit arithmetic left shift. In the saturated part, 2E15 in a case where the shift result is 2E15-1 (positive maximum value) or more,
−2E15 in the case of −2E15 (negative minimum value) or less, otherwise the lower 16 bits of the input are output. Here, 2E15 represents 2 to the 15th power.

Then, the data conversion unit 103 maintains the sign of the upper bit at the time of left shift, saturates other than the sign bit, that is, discards the upper bit, and embeds 0 in the lower bit. When S is positive, 1 is embedded in the lower bit. Further, at the time of right shift, the data conversion unit 103 embeds the sign bit in the upper bits (bits lower than the sign bit). Then, the data conversion unit 103 outputs the data obtained by rounding, shifting, and saturation processing as described above with the same bit width (for example, a 16-bit register) as the register of the register file 12 or the like. The data conversion unit is an example of an updating circuit that updates the decimal point position of fixed point number data occur.

Therefore, when the computer program executed by the processor 10 designates the shift amount in the operand of the instruction for executing the Dynamic Fixed Point operation, the processor 10 updates the decimal point position of the fixed point number by the designated shift amount during program execution.

If the instruction is an instruction giving an instruction on acquisition of statistical information (referred to as an instruction with statistical information acquisition function) as a result of decoding, statistical information is acquired in the statistical information acquisition unit 102 and stored in the statistical information storage unit 105. Here, statistical information is, as described above, (1) distribution of the most significant bit position which is non-sign, (2) distribution of the least significant bit position which is non-sign, (3) the maximum value of the most significant bit position which is non-sign, (4) the minimum value of the least significant bit position which is not a sign, or a combination thereof.

Figure 10:
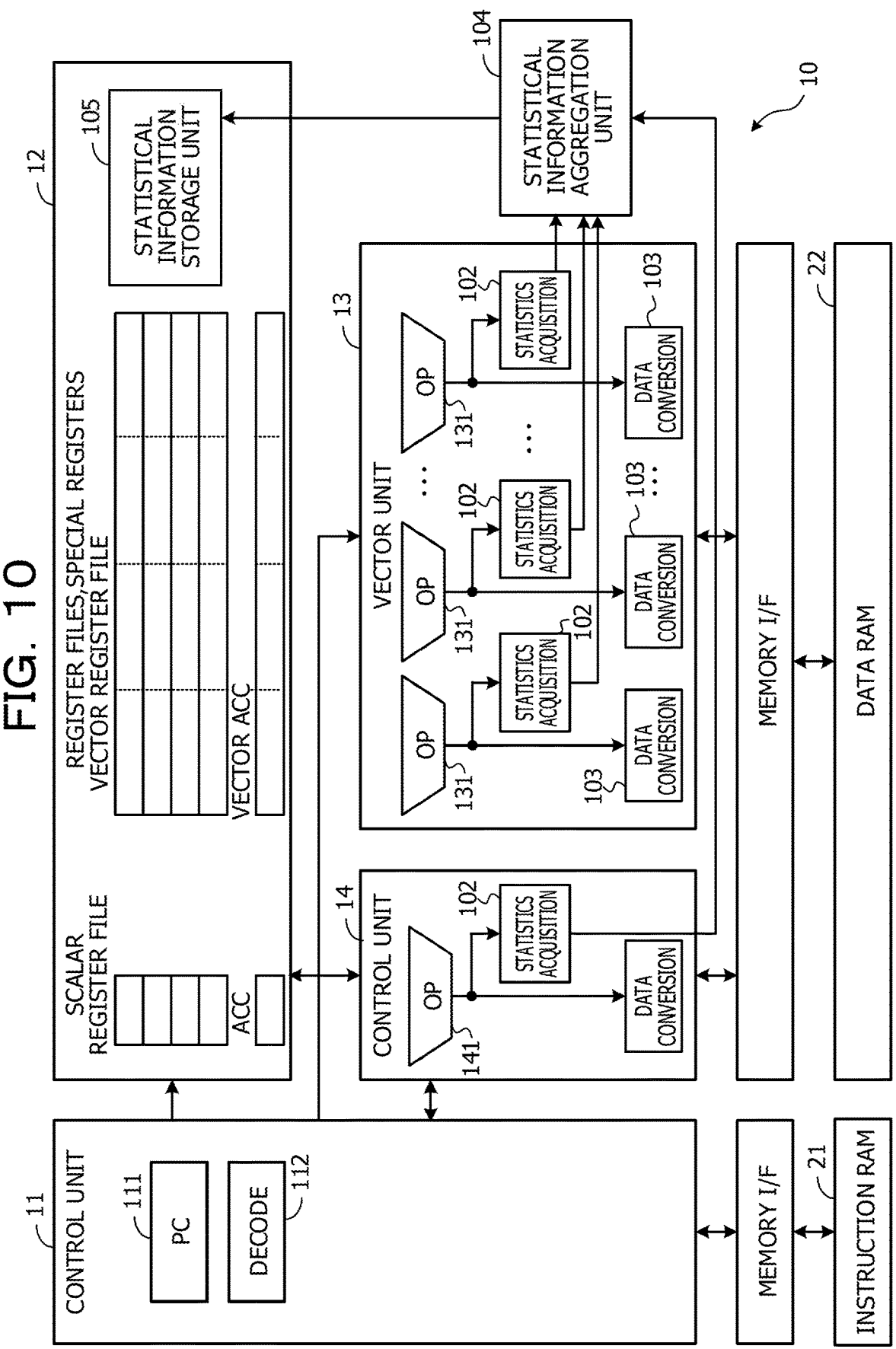
FIG. 10 is a diagram illustrating a circuit block of the processor.

FIG. 10 illustrates a circuit block of the processor 10 of FIG. 9. The processor 10 includes a control unit 11, a register file 12, a vector unit 13, and a scalar unit 14. The control unit 11 includes a program counter 111 and a decoder 112. The register file includes a vector register file, an accumulator register for vector operation (Vector ACC), a scalar register file, and an accumulator register for scalar operation (ACC). The vector unit 13 includes an operator 131 for vector operation, a statistical information acquisition unit 102, and a data conversion unit 103. The scalar unit 14 includes an operator 141 for scalar operation, a statistical information acquisition unit 102, and a data conversion unit 103.

Further, in the configuration example of FIG. 10, a statistical information aggregation unit 104 that aggregates statistical information from a plurality of statistical information acquisition units 102 is added. Also, the statistical information storage unit 105 is a part of the register file 12.

Further, the instruction memory 21 is connected to the control unit 11 via a memory interface (Memory I/F). Further, the data memory 22 is connected to the vector unit 13 and the scalar unit 14 via a memory interface (Memory I/F).

Figure 11A:
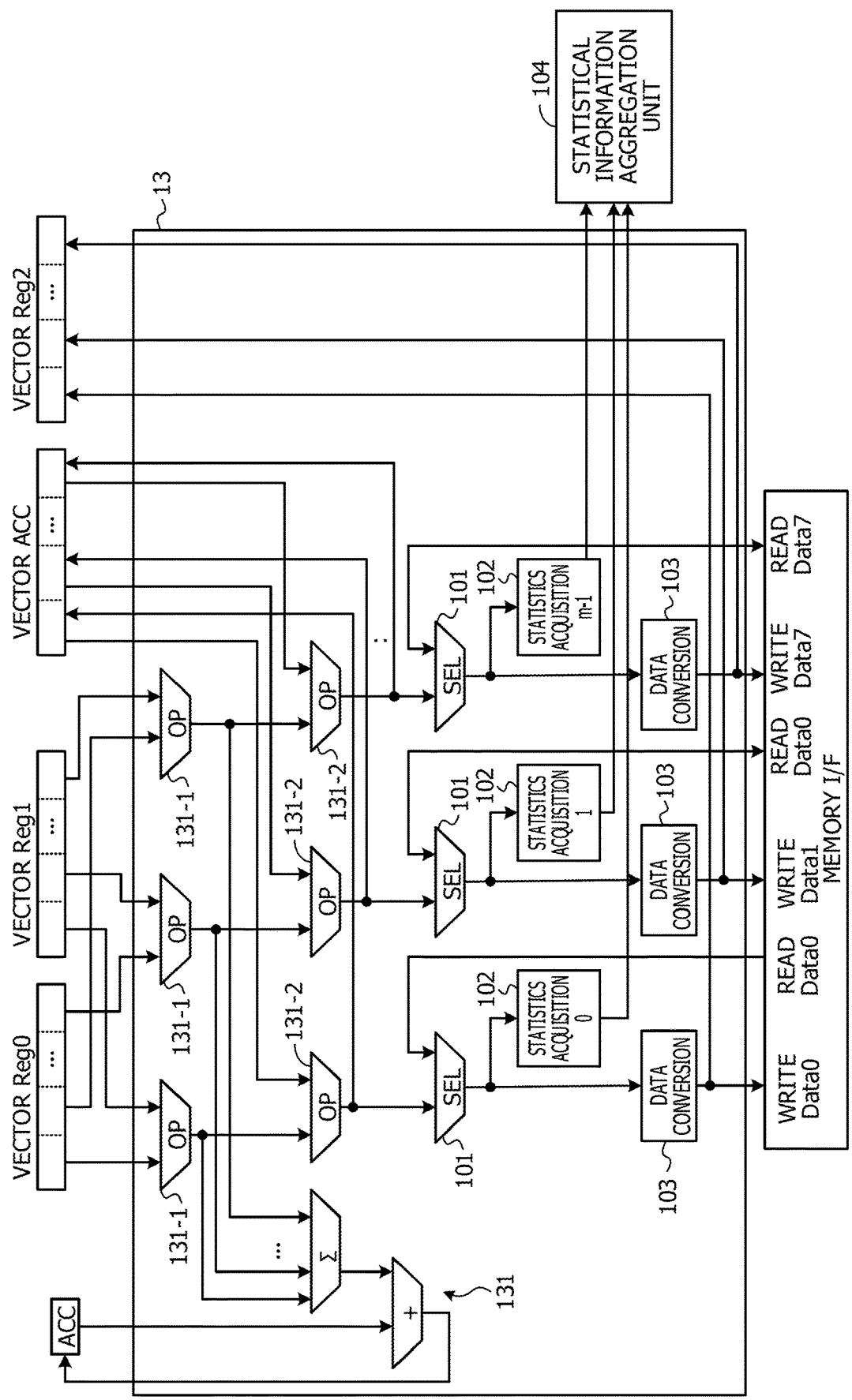
FIG. 11A is a diagram illustrating the details of a vector unit.

The details of the vector unit 13 are illustrated in FIG. 11A. The statistical information aggregation unit 104 is also illustrated in the drawing. The vector unit 13 operates the data of the vector register Vector Reg0 and Vector Reg1 by an operator 131-1 for vector operation. The operation result of the operator 131-1 for vector operation is input to an accumulator 132 for product-sum operation and an operator 131-2 for vector operation.

The accumulator 132 for product-sum operation performs addition on the operation result of the operator 131-1 for vector operation, and stores the result in the accumulator for scalar operation (ACC). The operator 131-2 for vector operation outputs the operation result of operator 131-1 for vector operation, data of accumulator register for vector operation (Vector ACC), or a result of sum of them, according to the operation mode specified by the instruction.

The selector 101 selects one of the output result of the operator 131-2 for vector operation and the read result (Read Data 0, . . . , Read Data 0) from the data memory 22, and inputs the result to the statistical information acquisition unit 102 and the data conversion unit 103. The statistical information acquired by the statistical information acquisition unit 102 is input to the statistical information aggregation unit 104. The data converted by the data conversion unit 103 may be stored in the data memory 22 (Write Data 0, . . . , Write Data n) via a selector (not illustrated) or may be held in the vector register (Vector Reg 2).

The configuration of the scalar unit 14 is illustrated in FIG. 11B. The scalar unit 14 includes a selector 142 that selects one of data obtained by an immediate value operand and data from the scalar register Scalar Reg1, and a scalar operator 141 that operates the selection result of the selector 142 and data of the scalar register Scalar Reg0. The operation result of the scalar operator 141 is stored in an address (for example, Addr) of the data memory 22 via the memory interface (Memory I/F). Further, the operation result of the scalar operator 141 is input to the statistical information acquisition unit 102 and the data conversion unit 103 via the selector 101.

The selector 101 selects one of the result of the operation of the operator 141 for scalar, the data of the scalar register Scalar Reg 2, the data of the accumulator register for scalar operation (ACC), and the data read via the memory interface (Memory I/F) (Read Data). The selector 101 inputs the selected data to the statistical information acquisition unit 102 and the data conversion unit 103. The statistical information acquisition unit 102 acquires statistical information from the data input from the selector 101, and inputs the statistical information to the statistical information aggregation unit 104.

Hereinafter, among the statistical information acquisition units 102, one that acquires the most significant bit position to be a non-sign will be referred to as a statistical information acquisition unit 102A. Further, among the statistical information acquisition units 102, one that acquires the least significant bit position to be a non-sign is referred to as a statistical information acquisition unit 102B. Also, among the statistical information aggregation units 104, one that is acquired by the statistical information acquisition unit 102 and counts bit positions to acquire the distribution of bits for the bit positions is referred to as a statistical information aggregation unit 104A. Further, among the statistical information aggregation units 104, one that performs logical sum operation on bit positions acquired by the statistical information acquisition unit 102 as a pre-stage for acquiring the maximum value and the minimum value of the bit positions is referred to as a statistical information aggregation unit 104B.

Figure 13A:
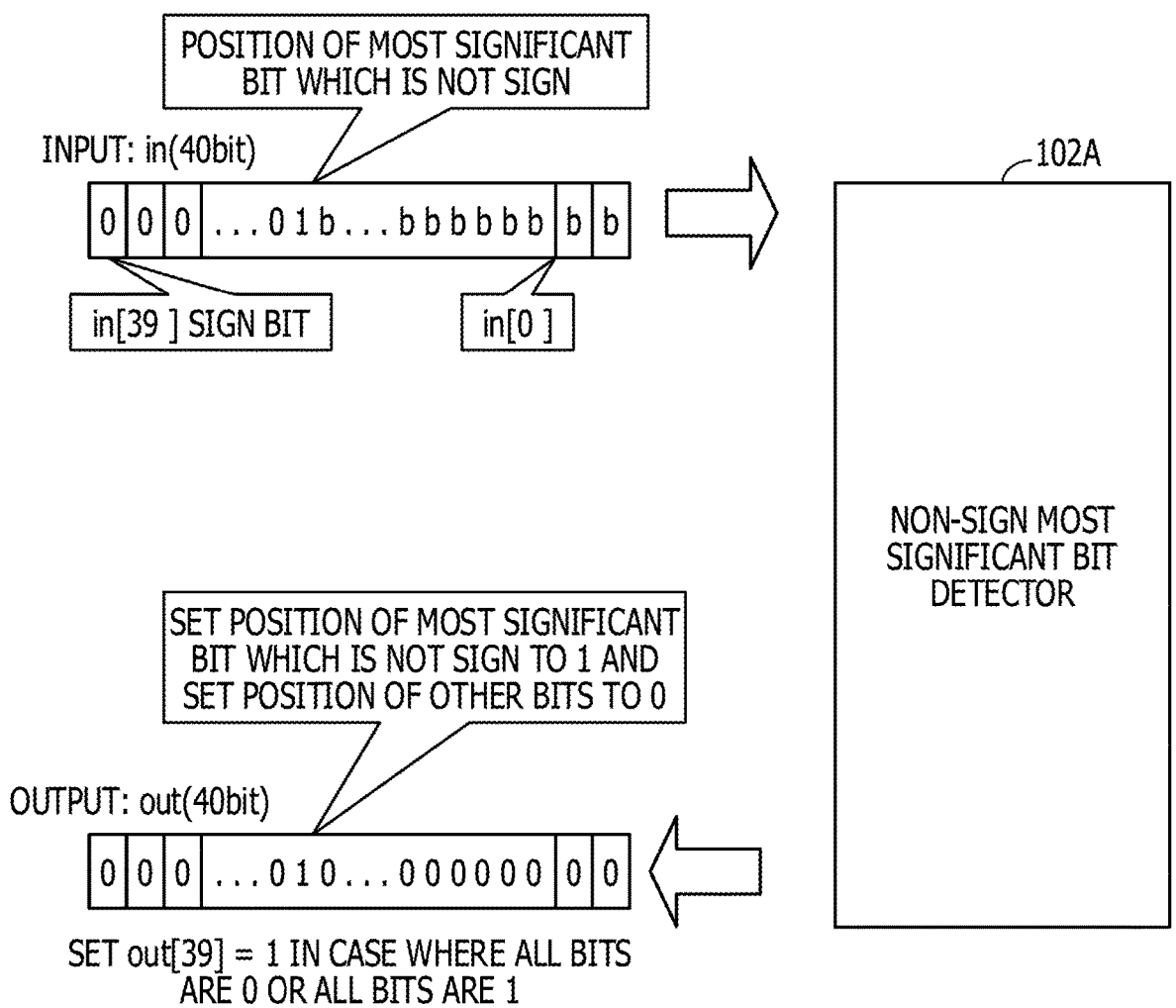
FIG. 13A is a diagram illustrating processing of a statistical information acquisition unit that acquires the most significant bit position which is not a sign.

FIG. 13A is a diagram illustrating processing of a statistical information acquisition unit 102A that acquires the most significant bit position which is not sign. In the drawing, the process by the non-sign most significant bit detector included in the statistical information acquisition unit 102A is illustrated. The non-sign most significant bit detector is, for example, a logic circuit defined in the truth table of FIG. 13B. In the example of FIG. 13A, input data (in(40 bit)) is illustrated in which the sign bit is 0, the bit in the position indicated as "position of the most significant bit that is not a sign" is 1, the bits higher than this bit are all 0, and the bits lower than this bit is b. Here, b is either 0 or 1. The statistical information acquisition unit 102A processes this input data, and generates output data (out(40 bit)) in which the most significant bit position that is not a sign is 1 and the other bit positions are 0. When the input data is all 0 or all 1, 1 is output to 39th bit and 0 is output to 38 bit or less. In the following description, the data of the operation circuit of the processor 10 is exemplified by 40-bit data, but the data of the operation circuit of the processor 10 is not limited to 40 bits.

FIG. 13B illustrates the truth table of the non-sign most significant bit detector. As illustrated in FIG. 13B, for a positive number, the non-sign most significant bit detector searches for bits in the lower bit direction from bit in[38], and the number of bit position that first became 1 is output with binary bit pattern. In addition, for a negative number, the non-sign most significant bit detector searches for bits in the direction of lower bits from in[38], and outputs the number of the bit position that first became zero with a binary bit pattern. Also, when the input data is all 0s or all 1s, the non-sign most significant bit detector outputs 1 at 39th bits and 0 at 38 bits or less.

Figure 14:
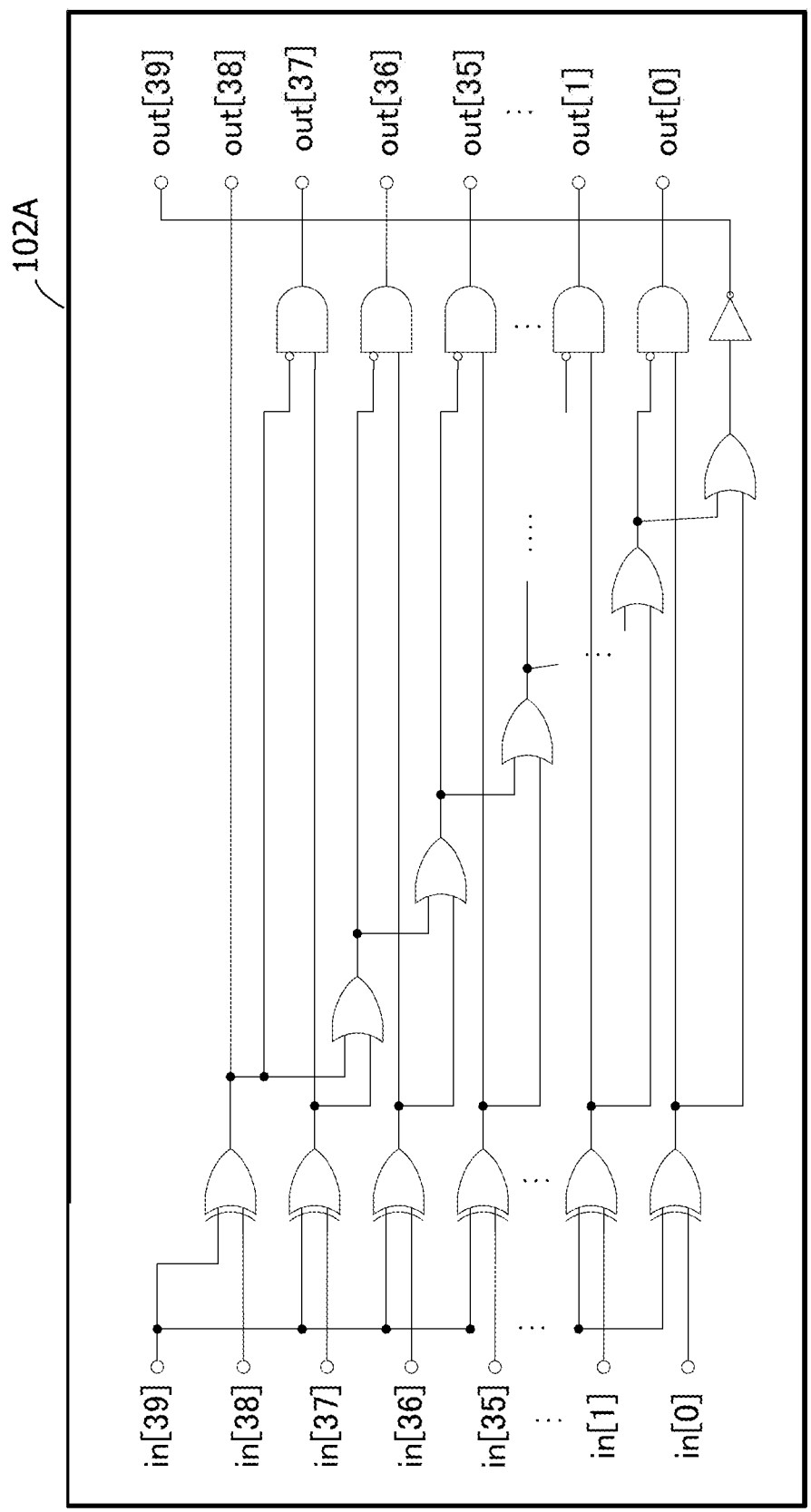
FIG. 14 is a diagram illustrating a configuration of a hardware circuit of a statistical information acquisition unit that acquires the most significant bit position which is not a sign.

FIG. 14 is a diagram illustrating a configuration of a hardware circuit of a statistical information acquisition unit 102A that acquires the most significant bit position which is not a sign. In this circuit, an exclusive OR (EXOR) of the sign bit in[39] and the other bits (in[38] to in[0]) is performed. Then, the exclusive OR value of bits having the same value as the sign bit in[39] is 0, and the exclusive OR value of bits having a value different from the sign bit in[39] is 1.

Now, if in[38] is a value different from in[39], out[38] of the output data becomes 1 by exclusive OR. On the other hand, the exclusive OR value of in[39] and in[37] is input to the output data out[37] through the AND gate. A bit value obtained by inverting the exclusive OR value of in[39] and in[38] is input to one input of this AND gate, so if in[39] and in[38] do not match, the output of the AND gate is 0 regardless of the exclusive OR value of in[39] and in[37].

Similarly, the exclusive OR value of in[39] and in[36] is input to the output data out[36] through the same AND gate as described above. At one input of this AND gate, a bit value obtained by inverting the logical sum (output of the OR gate) of two exclusive OR values, the exclusive OR value of in[39] and in[38], and the exclusive OR value of in[39] and in[37] is input. Therefore, when in[39] and in[38] do not match, the output of the AND gate is 0 regardless of the exclusive OR value of in[39] and in[36]. Hereinafter, similarly, the output of the AND gate is 0 regardless of the exclusive OR value of in[39] and in[i] (i is 37 or less).

On the other hand, if in[38] has the same value as in[39], the exclusive OR value of in[39] and in[38] is 0, and out[38] of the output data is 0. Therefore, the AND gate to which the exclusive OR value of in[39] and in[37] is input outputs 1 or 0 depending on the exclusive OR value of in[39] and in[37]. Similarly, the logically negated input of the AND gate from which out[i] (i is 37 or less) is output becomes 0 when the exclusive OR value of in[39] and in[j] (j is i+1 or more and 38 or less) is all 0, and when the exclusive OR value of in[39] and in[i] (i is 37 or less) becomes 1, 1 is set in out[i]. In the bits lower than the bit position (i), the input with logical negation of the AND gate to which out[i] is output is 1, so 0 is set in out[i]. Therefore, the circuit of FIG. 14 acquires output data out(40 bit) in which 1 is set to the position of the most significant bit that is not a sign and the other bits are set to 0. The statistical information acquisition unit 102A that acquires the position of the most significant bit that is not a sign in FIGS. 13 and 14 is an example of a circuit that acquires the position of the most significant bit that does not match the sign bit in the fixed point number data after execution of the instruction. In addition, output data out(40 bit) in which 1 is set to the position of the most significant bit that is not a sign and the other bits are set to 0 is an example of a bit string in which the position of the most significant bit position that does not match the sign bit is indicated as a true value (1).

Figure 15A:
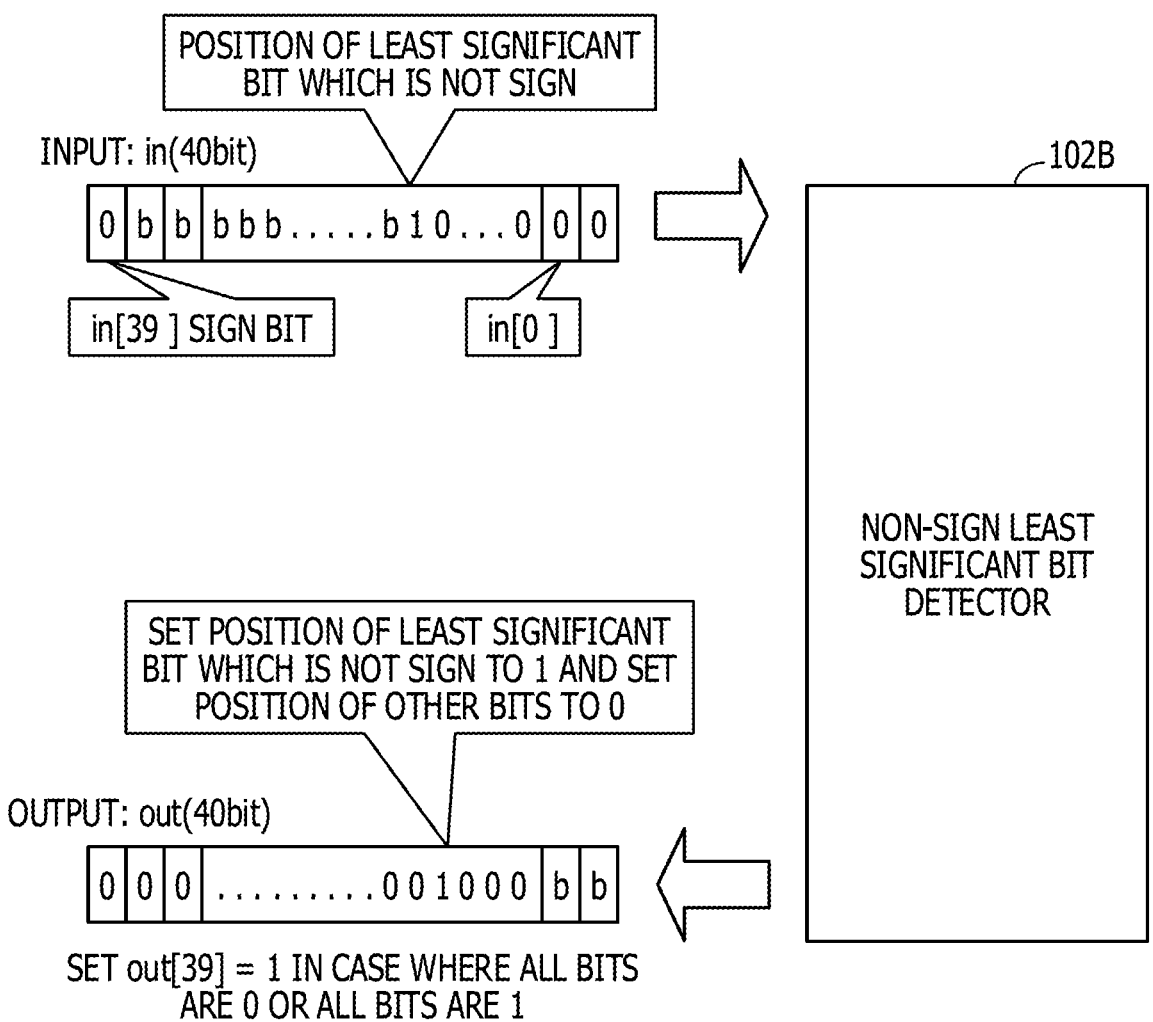
FIG. 15A is a diagram illustrating processing of a statistical information acquisition unit that acquires the least significant bit position which is not a sign.

FIG. 15A exemplifies the processing of the statistical information acquisition unit 102B that acquires the position of the least significant bit that is not a sign. In the figure, processing by the non-sign least significant bit detector included in the statistical information acquisition unit 102B is illustrated. The unsigned least significant bit detector is, for example, a logic circuit defined in the truth table of FIG. 15B. Also in the example of FIG. 15A, processing with a positive number is illustrated. In this example, input data is illustrated in which the sign bit in[39]=0, the bit at the position indicated as "the position of the least significant bit that is not a sign" is 1, the bits lower than this bit are all 0, and the bits upper than this bit (excluding the sign bit) are b. Here, b is either 0 or 1, and the input data is in(40 bit). The statistical information acquisition unit 102B processes this input data to generate output data (out(40 bit)) in which the least significant bit position to be a non-sign is 1 and the other bit positions are 0. When the input data is all 0 or all 1, 1 is output to 39th bit and 0 is output to 38 bit or less.

FIG. 15B illustrates the truth table of the non-sign least significant bit detector. As illustrated in FIG. 15B, for a positive number, the non-sign least significant bit detector searches for a bit in the direction of upper bits from in[O], and then outputs the number of the bit position that has first became one with a binary bit pattern. In addition, for a negative number, the non-sign least significant bit detector searches for bits in the direction of upper bits from in[O], and outputs the number of the bit position that first became zero with a binary bit pattern. In addition, when the input data is all 0 bits or all 1 bit, the non-sign least significant bit detector outputs 1 at 39th bit and 0 at 38 bit or less.

Figure 16:
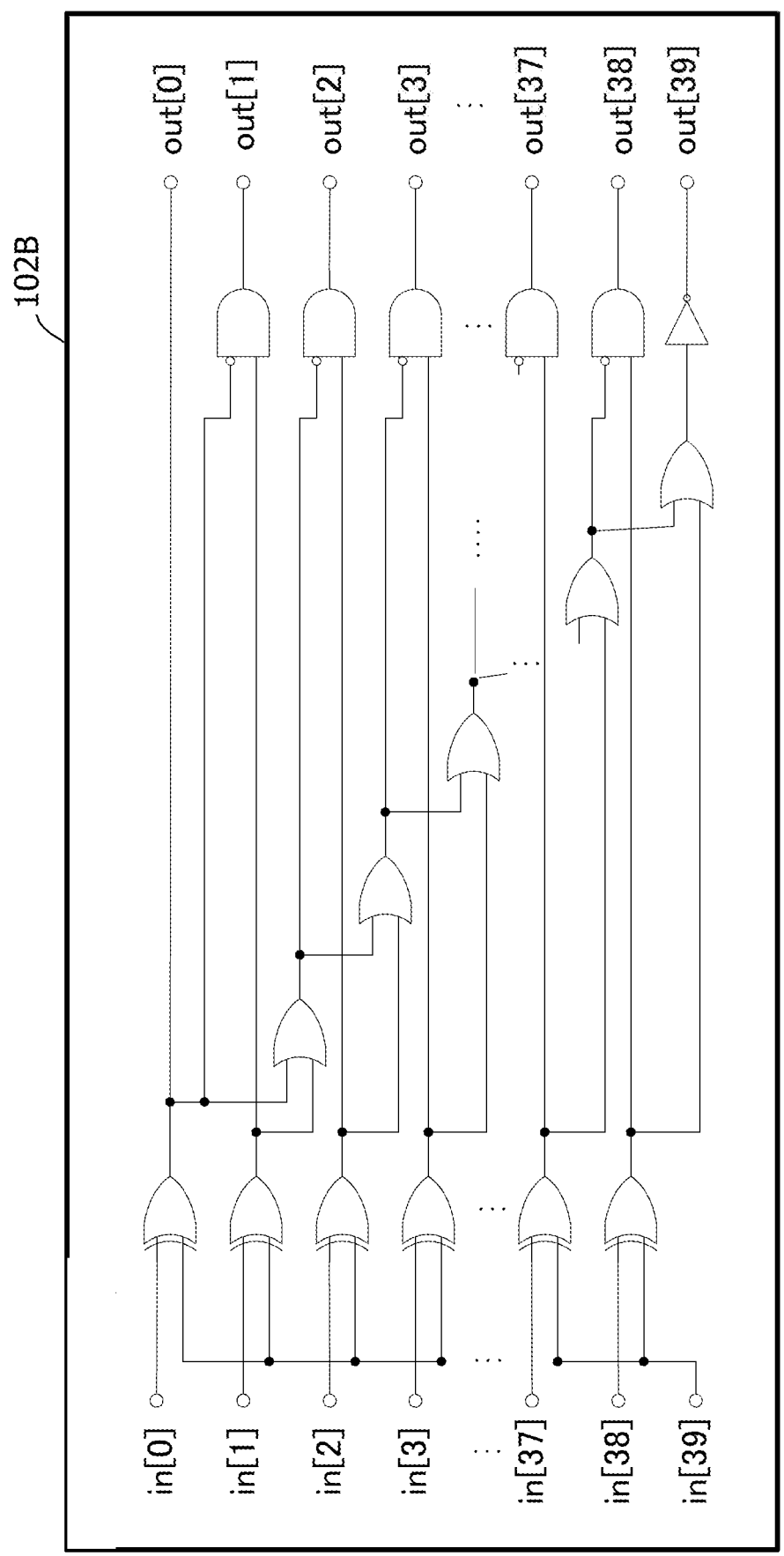
FIG. 16 is a diagram illustrating a configuration of a hardware circuit of a statistical information acquisition unit that acquires the least significant bit position which is not a sign.

FIG. 16 illustrates the configuration of the hardware circuit of the statistical information acquisition unit 102B that acquires the position of the least significant bit that is not a sign. When the sign bit in[39] is 0, the statistical information acquisition unit 102B may search for the bit position where the bit is 1 from the least significant bit in[0] toward the upper side. On the other hand, when the sign bit in[39] is 1, since the data is a complement, the statistical information acquisition unit 102B may search for the bit position where the bit is 0 from the least significant bit in[0] toward the upper side.

That is, in this circuit, an exclusive OR (EXOR) of the sign bit in[39] and the other bits (in[0] to in[38]) is performed. Then, the exclusive OR value of bits having the same value as the sign bit in[39] is 0, and the exclusive OR value of bits having a value different from the sign bit in[39] is 1.

If it is assumed that in[0] is a value different from in[39], then out[0] of the output data becomes 1 by exclusive OR. On the other hand, the exclusive OR value of in[39] and in[1] is input to the output data out[1] through the AND gate. A bit value obtained by inverting the exclusive OR value of in[39] and in[0] is input to one input of this AND gate. Therefore, when the exclusive OR value of in[39] and in[0] is 1, the output of the AND gate is 0 regardless of the exclusive OR value of in[39] and in[1].

Similarly, the exclusive OR value of in[39] and in[2] is input to the output data out[2] through the same AND gate as described above. At one input of this AND gate, a bit value obtained by inverting the logical sum (output of the OR gate) of two exclusive OR values, the exclusive OR value of in[39] and in[0], and the exclusive OR value of in[39] and in[1] is input. Therefore, when the exclusive OR value of in[39] and in[0] is 1, the output of the AND gate that outputs a value to out[2] of the output data becomes 0 regardless of the exclusive OR value of in[39] and in[2]. Hereinafter, similarly, regardless of the exclusive OR value of in[39] and in[i] (i is 1 or more), the output of the AND gate that outputs a value to out[i] of the output data becomes 0.

On the other hand, if in[0] has the same value as in[39], the output data out[0] becomes 0 by the exclusive OR, so the AND gate receiving the exclusive OR of in[39] and in[1] outputs 1 or 0 depending on the exclusive OR value of in[39] and in[1]. Similarly, the logically negated input of the AND gate from which out[i] (i is 1 or more) is output is becomes 0 when the exclusive OR of in[39] and in[J] (j is 0 or more and i−1 or less) is all 0, and when the exclusive OR value of in[39] and in[i] (i is 1 or more) becomes 1, 1 is set in out[i]. Further, 0 is set in the output data out[i] higher than the bit. Therefore, the circuit of FIG. 16 sets 1 in the position of the least significant bit that is not a sign, and obtains output data out(40 bit) in which the other bits are 0. The statistical information acquisition unit 102B that acquires the non-sign least significant bit position in FIGS. 15 and 16 is an example of a circuit that acquires the position of the least significant bit that does not match the sign bit. In addition, output data out(40 bit) in which 1 is set to the position of the least significant bit that is not a sign and the other bits are set to 0 is an example of a bit string in which the position of the least significant bit that does not match the sign bit is indicated as the true value (1).

Figure 17:
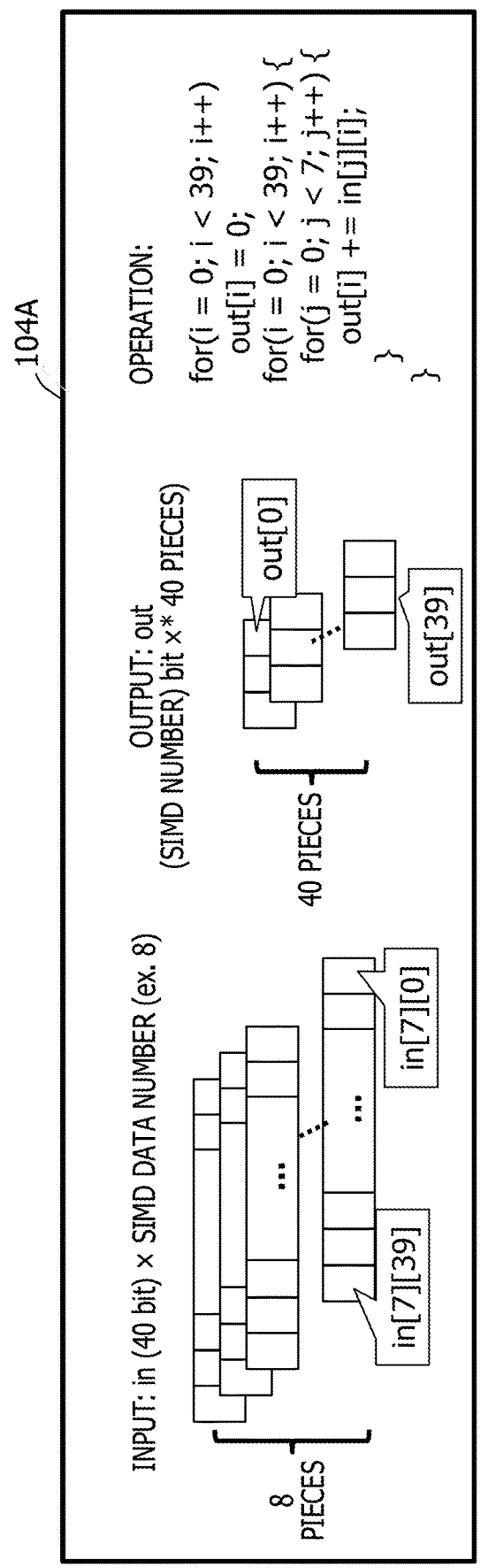
FIG. 17 is a diagram illustrating processing of a statistical information aggregation unit.

FIG. 17 is a diagram illustrating the process of the statistical information aggregation unit 104A that acquires the distribution of bits from the data acquired by the statistical information acquisition unit 102. In the figure, a process of acquiring a bit distribution from SIMD data in which eight 40-bit data are processed in parallel is illustrated. In FIG. 17, the processing of the statistical information aggregation unit 104A, which is a hardware circuit, is described in pseudocode.

That is, the input data is exemplified by array data of 8 (rows)×40 (bits). The 40-bit input data in each row is the position of the most significant bit that is not a sign (output of the statistical information acquisition unit 102A in FIG. 14) or the position of the least significant bit that is not a sign (output of the statistical information acquisition unit 102B in FIG. 16). In this process, all bits of the 40-bit output data out are first cleared. Next, the value of the element of each column i of the input data array in[j] [i] is added to all the rows (j=0 to 7). Therefore, unlike in FIGS. 13 and 15, in the pseudocode of FIG. 17, the output data (array element) out[j] is an integer of log 2 (number of SIMD data) bits (3 bits in the example of FIG. 17). Although it is assumed in FIG. 17 that the number of SIMD data (the number of data to be processed in parallel) is eight, the number of SIMD data is not limited to eight.

Figure 18:
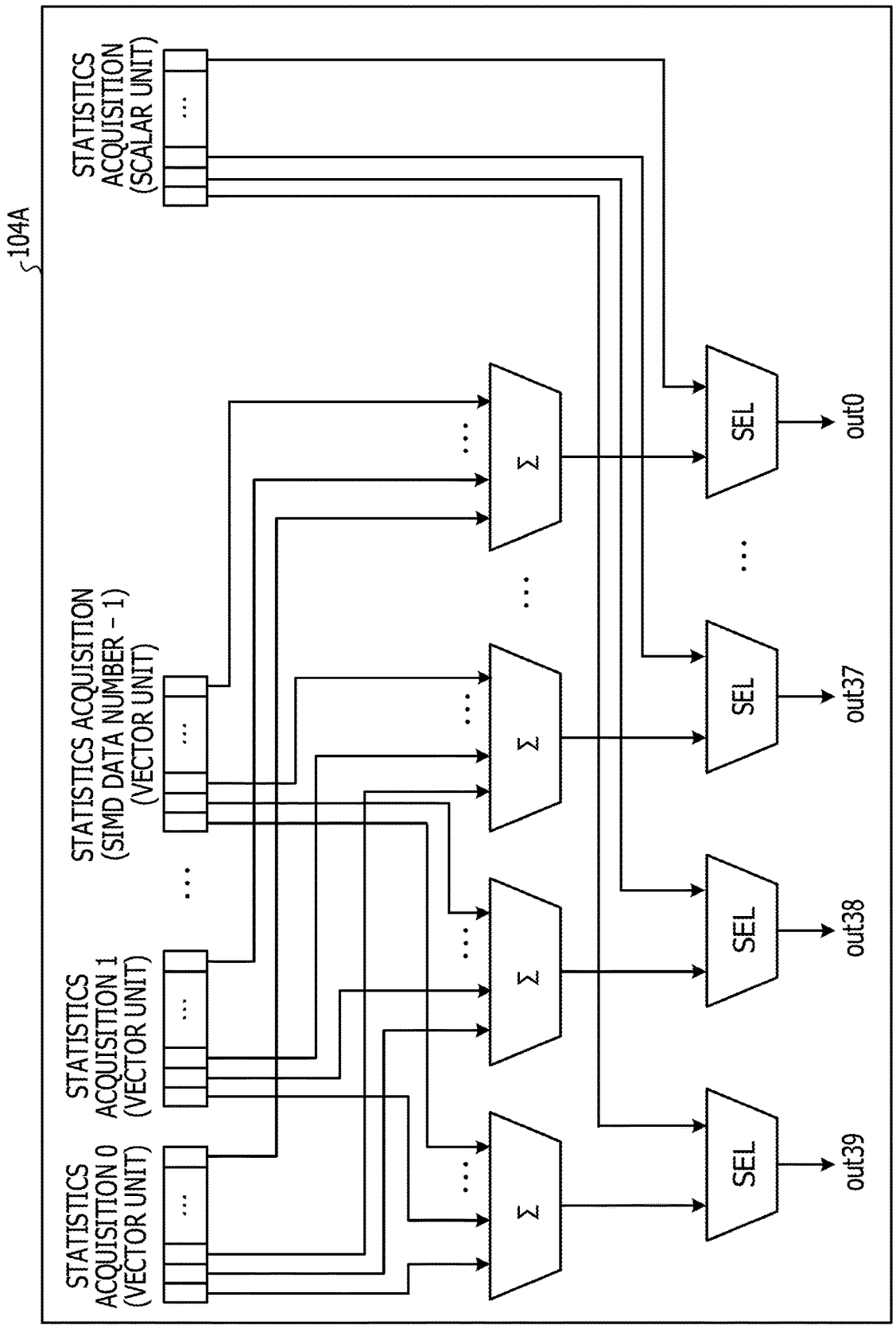
FIG. 18 is a diagram illustrating a configuration of a hardware circuit of the statistical information aggregation unit.

FIG. 18 illustrates the configuration of the hardware circuit of the statistical information aggregation unit 104A that acquires the distribution of bits from the data acquired by the statistical information acquisition unit 102. The number of is in the i-th bit (i=0 to 39) of eight pieces of statistical information of the data acquired by the statistical information acquisition unit 102 (here, statistical acquisition 0 to statistical acquisition (number of SIMD data −1)) is counted by bit population count operation. The input data is the position of the most significant bit that is not a sign and is acquired by the statistical information acquisition unit 102A (FIGS. 13 and 14). Therefore, statistical information aggregation unit 104A counts the number of times of occurrence of '1' of each bit with respect to the most significant bit position for the number of pieces of SIMD data that is not a sign and is acquired by the statistical information acquisition unit 102A to count the number of occurrences of the most significant bit position. The statistical information aggregation unit 104A stores the counting results from the output data out0 to out39.

The input data can also be the position of the least significant bit that is not a sign by the statistical information acquisition unit 102B (FIGS. 15 and 16). The statistical information aggregation unit 104A counts the number of occurrences of '1' of each bit with respect to the position of the least significant bit that is not a sign for the number of pieces of SIMD data acquired by the statistical information acquisition unit 102B to count the number of occurrences of the position of the least significant bit. The statistical information aggregation unit 104A stores the counting results from the output data out0 to out39. That is, the statistical information aggregation unit 104A can process either the position of the most significant bit that is not a sign or the position of the least significant bit that is not a sign.

Further, in FIG. 18, the selector (SEL) selects data acquired from the bit population count computing unit (1) and the scalar unit 14. The data selected by the selector (SEL) is output to the output data out0 to out39. Therefore, the data acquired by the statistical information acquisition unit 102 in the scalar unit 14 is output as it is to the output data out0 to out39 without being added in one operation of the scalar unit 14. Out0 to out39 are data to be delivered to the statistical information storage unit 105 (see input data in0 to in39 of 105A of FIGS. 21 and 105B of FIG. 22). The statistical information aggregation unit 104A illustrated in FIGS. 17 and 18 is an example of a circuit that accumulates and counts the position of the most significant bit that does not match the sign bit with respect to a plurality of pieces of fixed point number data occur. The statistical information aggregation unit 104A in FIGS. 17 and 18 is also an example of a circuit that accumulates and counts the position of the least significant bit that does not match the sign bit with respect to the plurality of pieces of fixed point number data occur.

Figure 19:
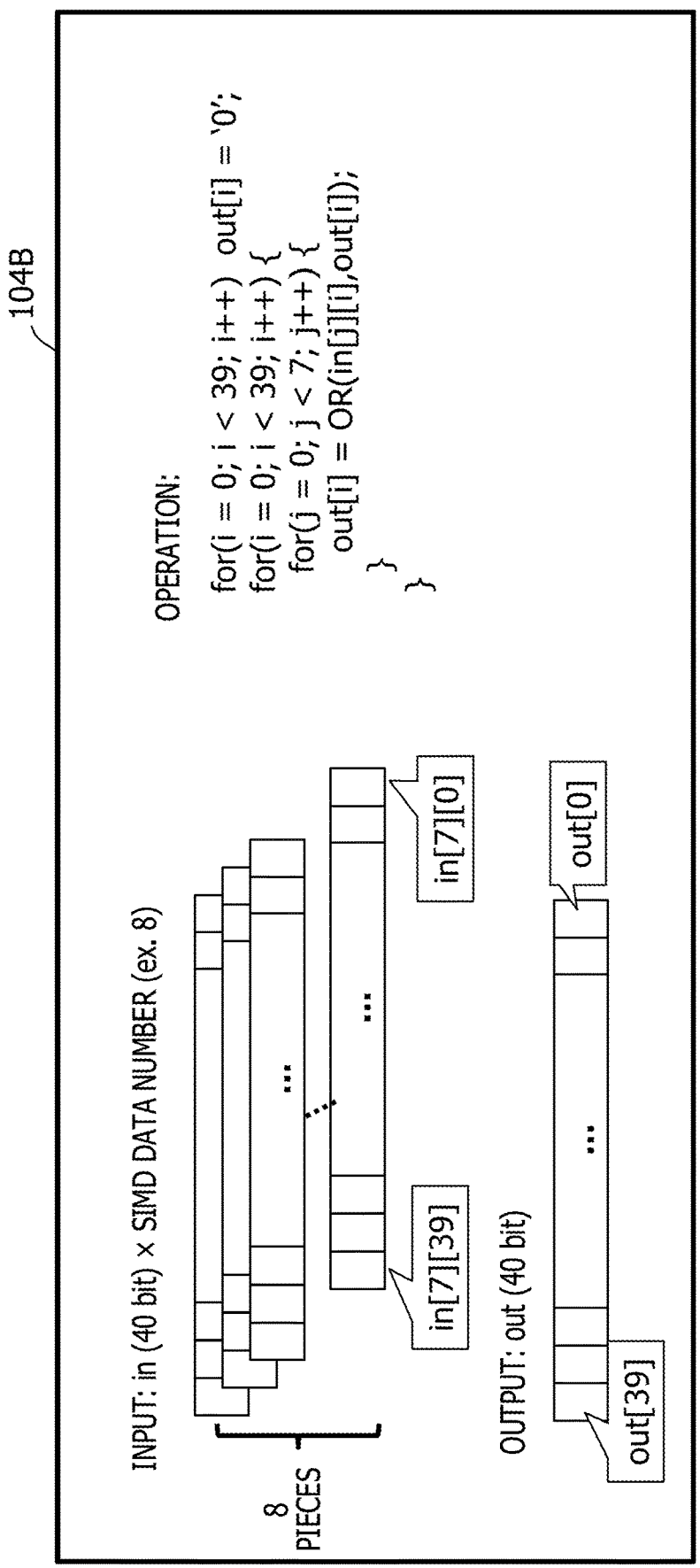
FIG. 19 is a diagram illustrating processing of the statistical information aggregation unit.

FIG. 19 is a diagram illustrating a process of the statistical information aggregation unit 104B for aggregating bit positions by logical sum operation, on the premise that the maximum value and the minimum value of bit positions are acquired from data acquired by the statistical information acquisition unit 102. Also in FIG. 19, as in FIG. 17, processing of SIMD data in which eight 40-bit data are processed in parallel is exemplified. In FIG. 19, the processing of the statistical information aggregation unit 104B which is a hardware circuit is described in pseudocode.

In this process, to the 40-bit output data out[i] (i=0, . . . , 39), the result of the logical sum operation (OR operation) of all the columns of the array in[j] [i] of the input data for all rows (j=0, . . . , 7) is input. Therefore, in the pseudocode in FIG. 19, unlike in FIG. 17, the output data (array element) out[i](i=0, . . . , 39) is a bit string. As a result of the above processing, in the output data out[i] (i=0, . . . , 39), the bit position that first becomes 1 from the out[38] toward the lower bit direction is the maximum bit position. In addition, the bit position that becomes 1 first from the out[0] toward the upper bit direction is the minimum bit position.

Figure 20:
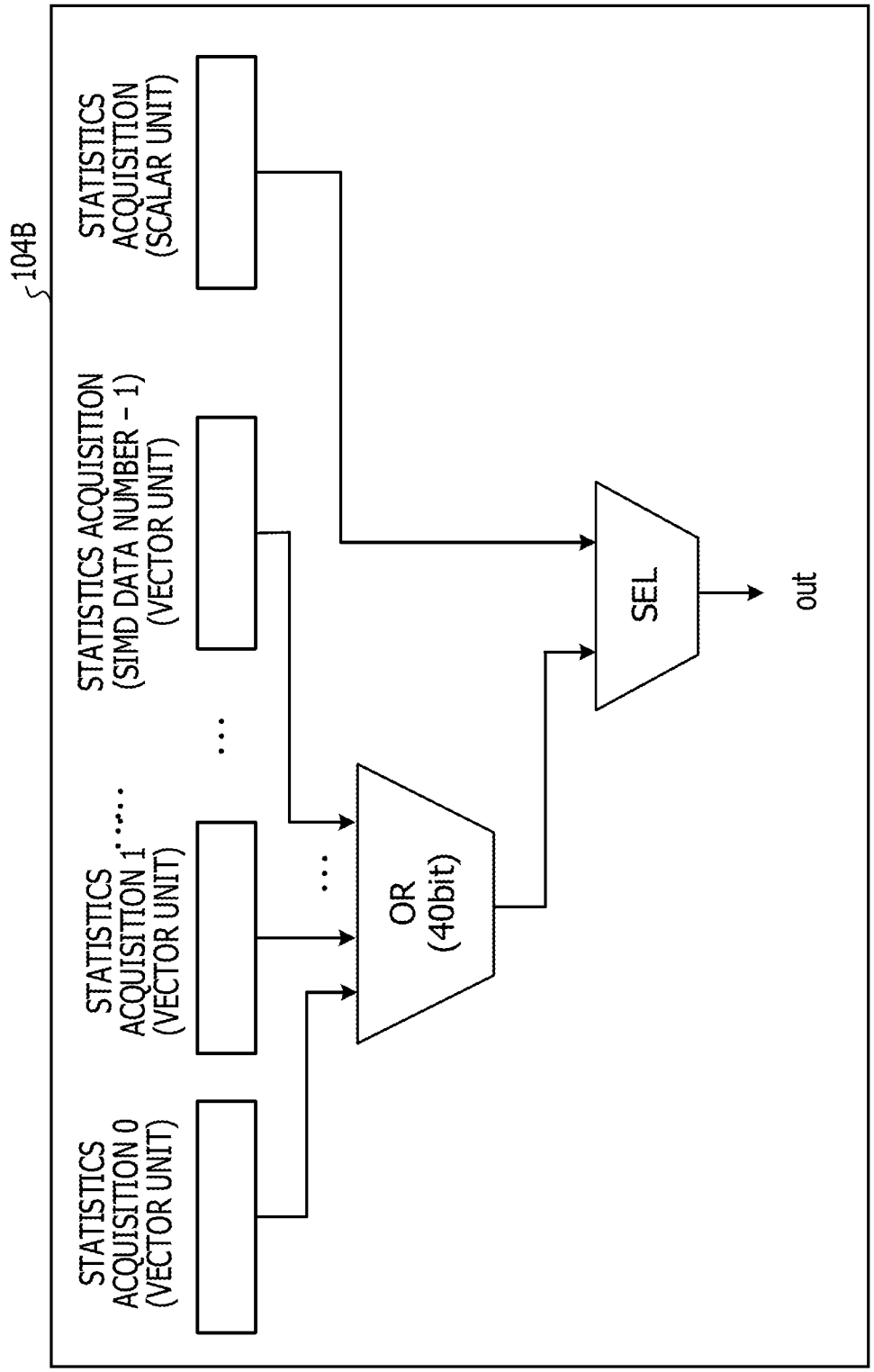
FIG. 20 is a diagram illustrating a configuration of the hardware circuit of the statistical information aggregation unit.

FIG. 20 exemplifies the configuration of the hardware circuit of the statistical information aggregation unit 104B that aggregates bit positions by logical sum operation as a premise of acquiring the maximum value and the minimum value of bit positions from the data acquired by the statistical information acquisition unit 102. The data acquired by the statistical information acquisition unit 102 (here, from the statistical acquisition 0 to the statistical acquisition SIMD data number−1) is subjected to the OR operation by an OR gate (40 bits). Further, in FIG. 18, the selector (SEL) selects data obtained from the logical sum operation (OR) and the scalar unit 14. The data subjected to the selector (SEL) is output to the output data out. Therefore, the data acquired by the statistical information acquisition unit 102 in the scalar unit 14 is output as it is to the output data out without performing the logical sum operation in one operation. out is data to be delivered to the statistical information storage unit 105.

The statistical information aggregation unit 104B that aggregates bit positions by logical sum operation is an example of a circuit that accumulates a bit string indicating the position of the most significant bit that does not match the sign bit as a true value by logical sum operation on the plurality of pieces of fixed point number data occur. The statistical information aggregation unit 104B that aggregates bit positions by logical sum operation is also an example of a circuit that accumulates a bit string indicating the position of the least significant bit that does not match the sign bit as a true value by logical sum operation on the plurality of pieces of fixed point number data occur.

Figure 21:
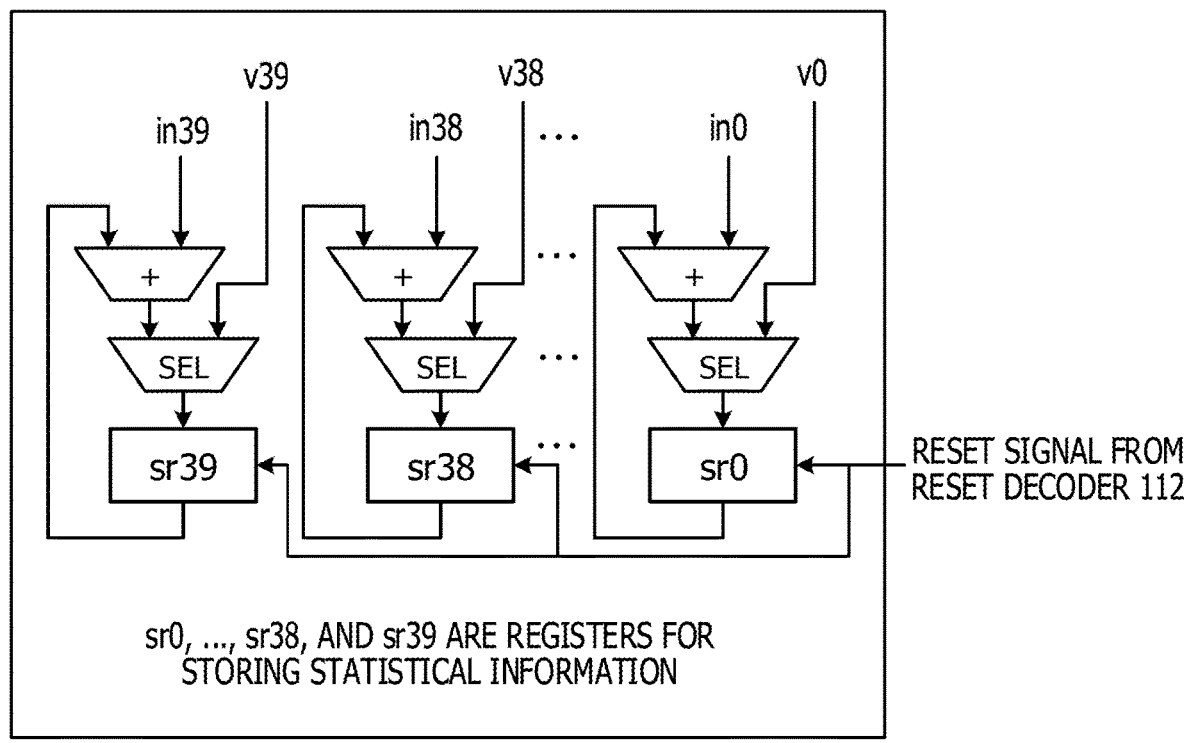
FIG. 21 is a diagram illustrating a configuration of a hardware circuit of a statistical information storage unit.

FIG. 21 illustrates the configuration of the statistical information storage unit 105A that stores the statistical information from the statistical information aggregation unit 104A in a dedicated register as a specific example of the statistical information storage unit 105 (see FIG. 10). In the drawing, in39 to in0 indicate statistical information from the statistical information aggregation unit 104 corresponding to out39 to out0 in FIG. 18. Also, sr39 to sr0 are register values for storing statistical information. The processor 10 writes the initial values v39 to v0 to any one or more of the registers sr39 to sr0 via the selector SEL according to the write instruction. However, the processor 10 may reset the registers sr39 to sr0 by a reset signal from the decoder. The processor 10 accumulates statistical information using an adder for each execution of an instruction with a statistical information acquisition function, and stores the statistical information in the registers sr39 to sr0. The combination of the statistical information aggregation unit 104A (FIGS. 17 and 18) and the statistical information storage unit 105A (FIG. 21) that stores the statistical information from the statistical information aggregation unit 104A in a dedicated register is an example of a circuit that accumulates and counts the position of the most significant bit that does not match the sign bit with respect to the plurality of pieces of fixed point number data. The combination of the statistical information aggregation unit 104A (FIGS. 17 and 18) and the statistical information storage unit 105A (FIG. 21) that stores the statistical information from the statistical information aggregation unit 104A in a dedicated register is also an example of a circuit that accumulates and counts the position of the least significant bit that does not match the sign bit with respect to the plurality of pieces of fixed point number data. Further, the processor 10 reads one or more values of any one of the registers (sr39 to sr0), and stores the value in the data memory designated by the read instruction, or stores it in the general purpose register designated by the read instruction.

Figure 22:
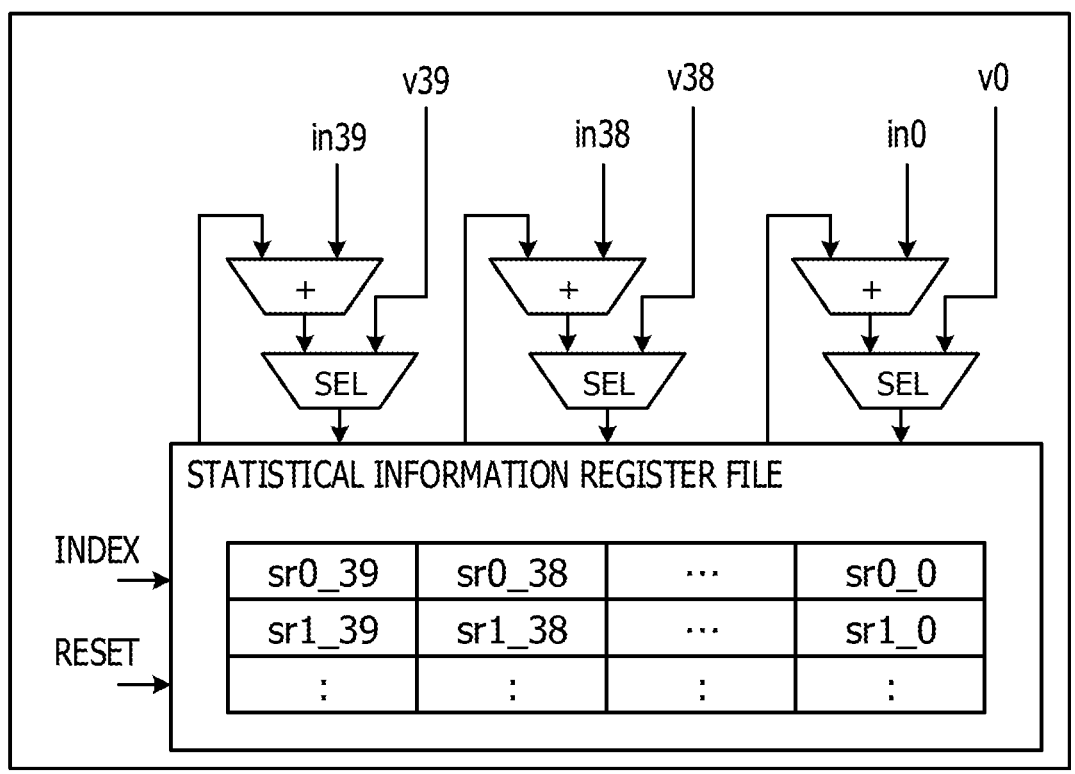
FIG. 22 is a modification of the statistical information aggregation unit.

FIG. 22 is a modification of the statistical information aggregation unit 104 and is a configuration example of a circuit in which the storage destination of the statistical information is designated by the index from the decoder 112. In the figure, for example, a register region of sr [j] [i] (j=0, . . . , k, i=0, . . . , 39) is secured, and index designates row j of the register file.

The processor 10 writes an initial value to one or more registers of the row j of the register file specified by the index via the selector SEL by the write instruction. However, the processor 10 may reset the row j of the register file specified by the index by a control signal from the decoder 112. Then, the processor 10 accumulates the statistical information from in39 to in0 with an adder, and stores the statistical information in the row j of the register file specified by the index. Also, the processor 10 reads the statistical information from the row j of the register file specified by the index according to the control signal from the decoder 112. Further, the processor 10 reads one or more values of any one of the row j of the register file specified by the index, and stores it in the data memory specified by the read instruction, or stored in a general-purpose register specified by the read instruction.

Figure 23:
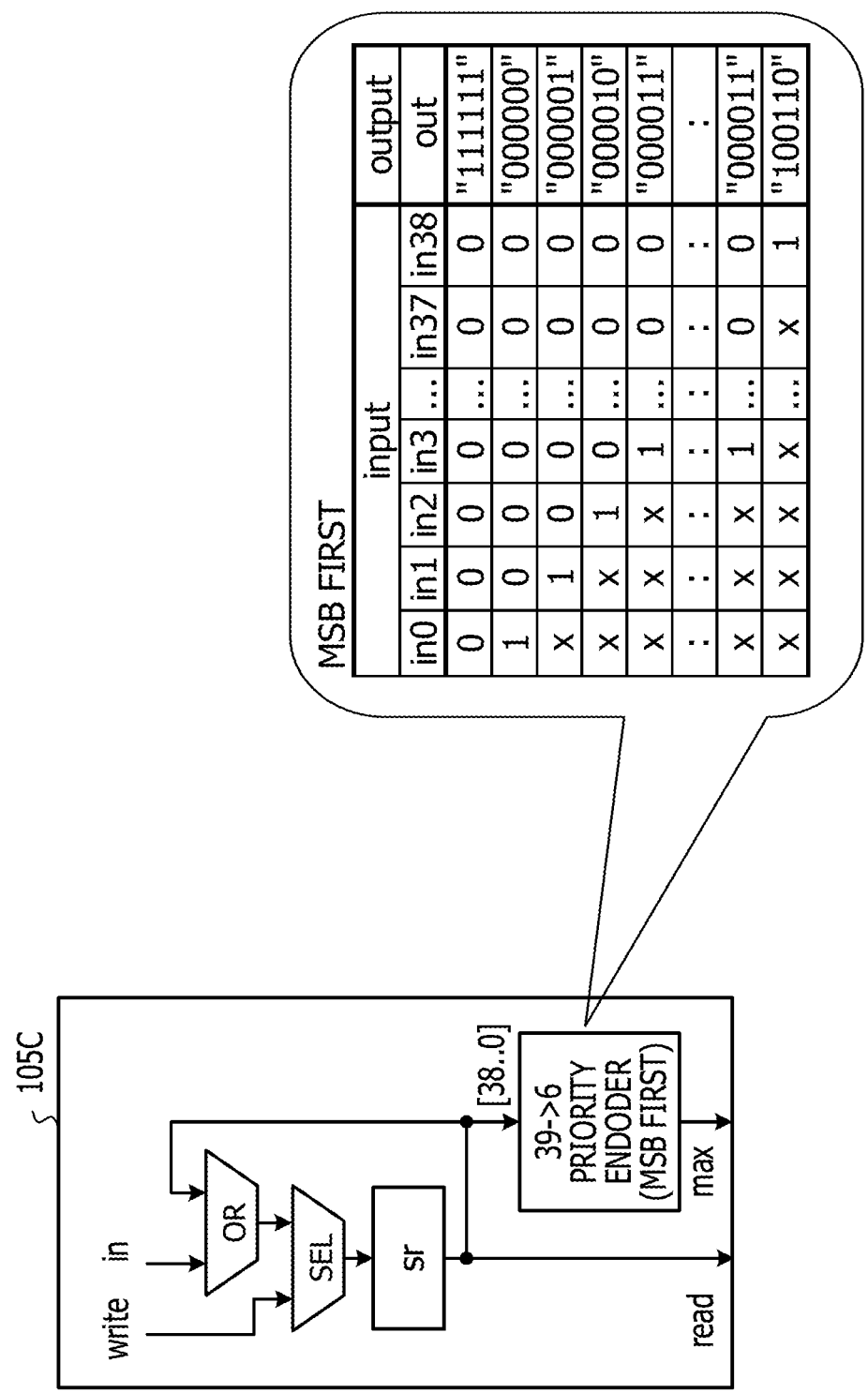
FIG. 23 is a diagram illustrating a configuration of the hardware circuit of the statistical information storage unit.

FIG. 23 is a diagram illustrating a configuration of a hardware circuit of the statistical information storage unit 105C that accumulates statistical information of bit positions that have been subjected to the logical sum operation by the statistical information aggregation unit 104B illustrated in FIGS. 19 and 20, and reads out the maximum value of the bit positions of the accumulated statistical information. The statistical information storage unit 105C has a register (sr) for accumulating statistical information of bit positions subjected to the logical sum operation by the statistical information aggregation unit 104B. The processor 10 can write an initial value to the register (sr) via the selector (SEL) by a write instruction (write). However, the processor 10 may enable the register (sr) to be reset by the reset signal.

Also, the statistical information storage unit 105C performs an logical sum operation of the logical sum operation result (in) of the statistical information aggregation unit 104B and the statistical information already accumulated in the register (sr), and stores the result of the logical sum operation in the register (sr) through the selector (SEL).

Further, the processor 10 reads the value of the register (sr) through the selector (SEL) according to the read instruction, and stores the value in the data memory designated by the read instruction or the general purpose register designated by the read instruction. Also, the statistical information storage unit 105C may have a priority encoder (MSB first). The priority encoder (MSB first) outputs the position (−1 to 38) of the most significant bit 1 in the bit string stored in the register (sr) in binary. For example, when all bits 0 are input as input data in, the priority encoder (MSB first) outputs "111111" (−1). In addition, when data in which in0=1 and all other bits are 0 is input as input data in, priority encoder (MSB first) outputs "000000" (0). Also, when data in which in0=x (0 or 1), in1=1, and all other bits are 0 as input data in is input, priority encoder (MSB first) outputs "000001" (1). Similarly, when data of in 0 to in 37x (0 or 1) and in 38=1 is input as input data in, the priority encoder (MSB first) outputs "100110" (38). The processor 10 can obtain the maximum value of the bit position as a binary value from the statistical information of the bit position that has been subjected to the logical sum operation by the statistical information aggregation unit 104B via the priority encoder (MSB first). The combination of the statistical information aggregation unit 104B (FIG. 19 and FIG. 20) for aggregating bit positions by the logical sum operation of FIG. 19 and FIG. 20 and the statistical information storage unit 105C is an example of a circuit that accumulates a bit string indicating the position of the most significant bit that does not match the sign bit as a true value by logical sum operation on the plurality of pieces of fixed point number data occur, and acquires the position of the highest true value in the accumulated bit string.

Figure 24:
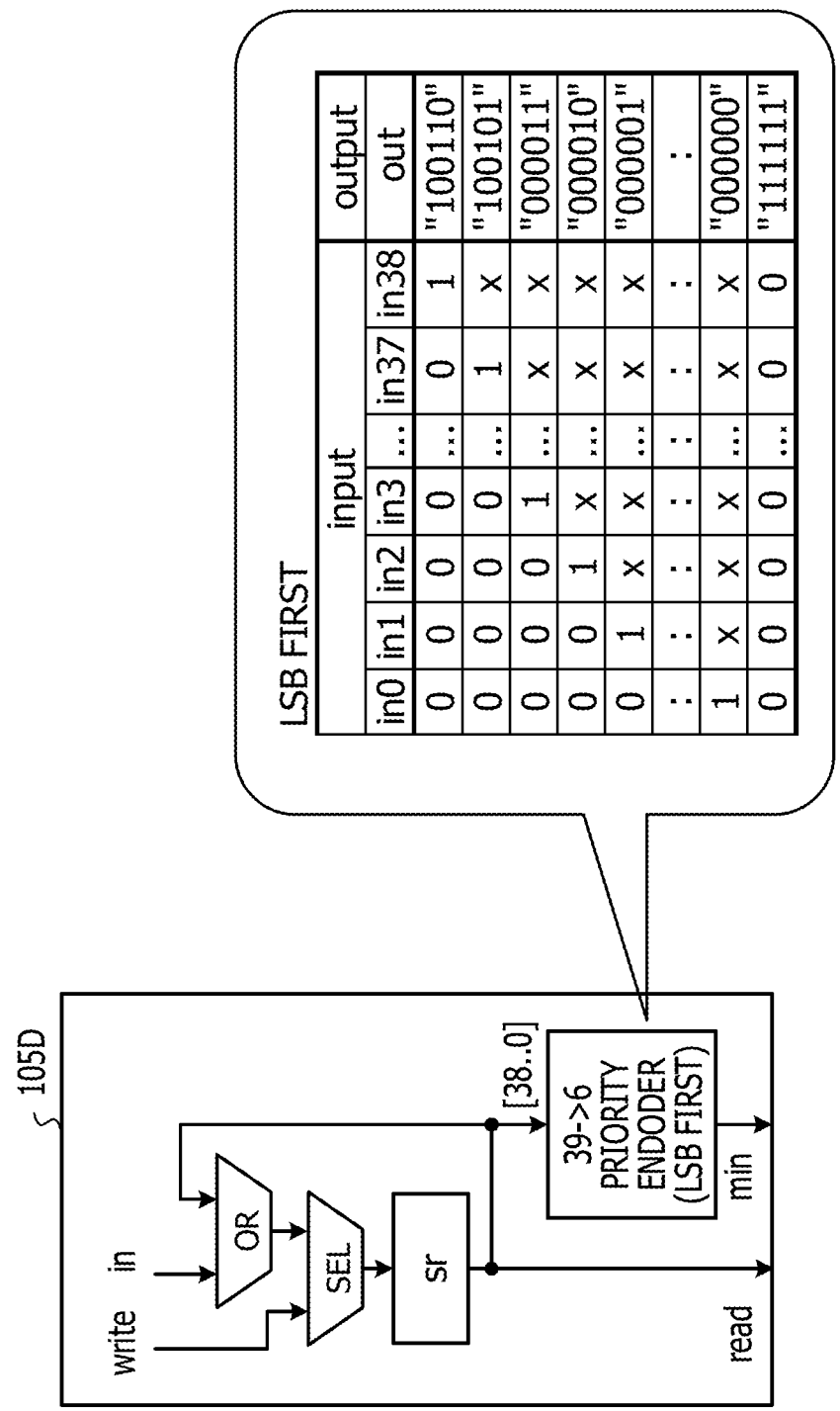
FIG. 24 is a diagram illustrating a configuration of the hardware circuit of the statistical information storage unit.

FIG. 24 is a diagram illustrating a configuration of a hardware circuit of the statistical information storage unit 105D that accumulates statistical information of bit positions that have been subjected to the logical sum operation by the statistical information aggregation unit 104B illustrated in FIGS. 19 and 20, and reads out the minimum value of the bit positions of the accumulated statistical information. The statistical information storage unit 105D has a priority encoder (LSB first) instead of the priority encoder (MSB first) of the statistical information storage unit 105C. The configuration of the statistical information storage unit 105D other than priority encoder (LSB first) is the same as that of the statistical information storage unit 105C, and thus the description thereof is omitted.

The priority encoder (MSB first) outputs the position (−1 to 38) of the least significant bit 1 in the bit string stored in the register (sr) in binary. For example, when all bits 0 are input as input data in, the priority encoder (LSB first) outputs "111111" (−1). Also, when data of in 0=1 and other bits of x (0 or 1) are input as input data in, the priority encoder (LSB first) outputs "000000" (0). When data in which the input data in0=0, in1=1, and the other bits (in2 to in38) are x (0 or 1) data is input as the input data in, the priority encoder (LSB first) outputs "000001" (1). Similarly, when data of in0 to in37 of 0 and in38=1 is input as the input data in, the priority encoder (LSB first) outputs "100110" (38). The processor 10 can obtain the minimum value of the bit position as a binary value from the statistical information of the bit position subjected to the logically logical sum operation by the statistical information aggregation unit 104B via the priority encoder (LSB first). The combination of statistical information aggregation unit 104B (FIG. 19 and FIG. 20) and statistical information storage unit 105D (FIG. 24) for aggregating bit positions by logical sum operation is an example of a circuit that accumulates the bit string indicated by a true value by a logical sum operation on the plurality of fixed point number data occur, and acquires the position of the lowest true value in the accumulated bit string.

Figure 25:
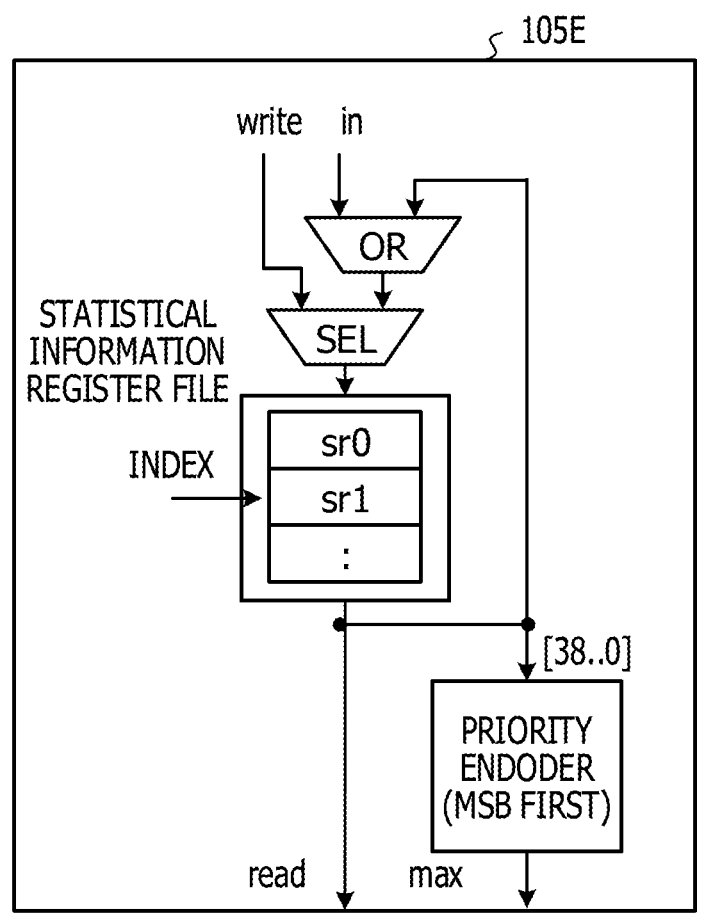
FIG. 25 is a diagram illustrating a configuration of a statistical information storage unit of a modification.
Figure 26:
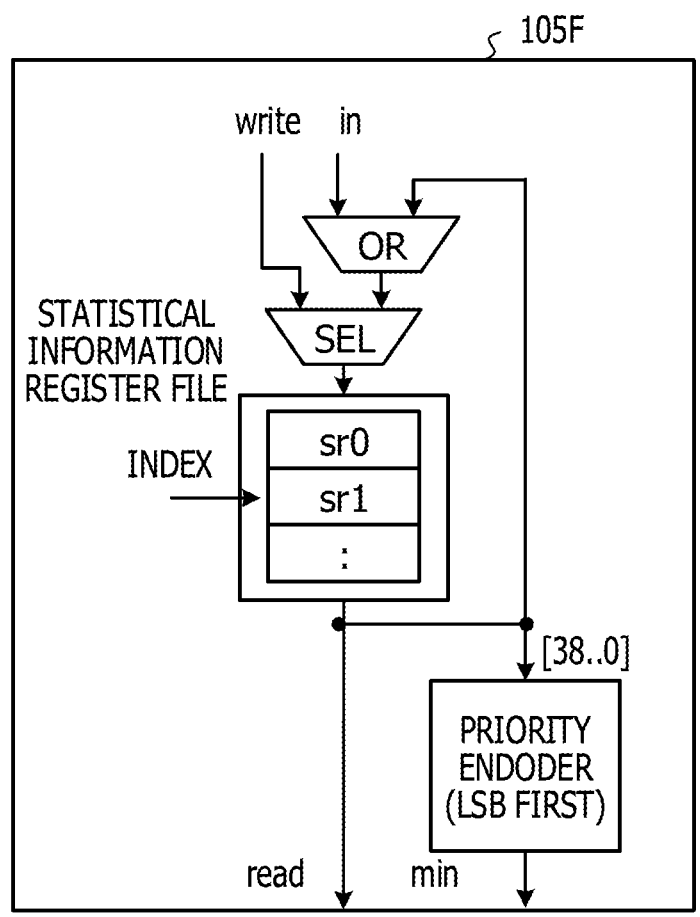
FIG. 26 is a diagram illustrating a configuration of a statistical information storage unit of a modification.

FIG. 25 is a diagram illustrating a configuration of a statistical information storage unit 105E of a modification in which the register (sr) of the statistical information storage unit 105C of FIG. 23 is a register file. FIG. 26 is a diagram illustrating a configuration of a statistical information storage unit 105F of a modification using the register (sr) of the statistical information storage unit 105D of FIG. 24 as a register file. In FIGS. 25 and 26, for example, the regions sr0, sr1, . . . , srj, . . . are secured, and the row j of the register file is specified by the index. The processor 10 sets an initial value to the row j of the register file specified by the control signal from the decoder 112 or by the index, accumulates statistical information (input data in), reads statistical information from the row j, or the like.

<Instruction with Statistical Information Acquisition Function>

Hereinafter, the configuration of an instruction with a statistical information acquisition function will be exemplified. Here, method 1 and method 2 are illustrated as a method of constructing an instruction.

(Method 1) In method 1, an operation instruction for acquiring statistical information, a load instruction, and the like are individually added to the instruction set of the processor 10. The configuration of the following instruction is an example, and the processor 10 is not limited to the following instruction.

[vmul_s Instruction]

Configuration of instruction: vmul_s vs, vt, vd, imm

The vmul_s instruction is an instruction for the processor 10 to multiply the vector register vs and vt, shift it by imm bits, round and saturate, and store it in the vector register vd. The processor 10 acquires the pre-shift statistical information of the multiplication result and accumulates it in the statistical information register. The statistical information register is, for example, sr0 to sr39 of FIG. 21, srj_i (j=0, 1, . . . , i=0, 1, . . . ) of the statistical information register file of FIG. 22, the registers (sr) of FIGS. 23 and 24, or the registers sr0, sr1, . . . of the statistical information register file of FIGS. 25 and 26. The same applies to the statistical information register.

Note that read/write and load/store instructions are also separately prepared for the processor 10 to exchange statistical information between the internal register and the data memory 22. Also, a reset instruction may be separately prepared for the processor 10 to reset an internal register. The same applies below.

[vld_s Instruction]

Configuration of instruction: vld_s rt, rd

The vld_s instruction is an instruction for the processor 10 to load vector data from the address obtained by adding the address register rs and rt and to store the vector data in the vector register rd. The processor 10 acquires statistical information of the loaded data and accumulates it in the statistical information register.

[read_acc_s Instruction]

Instruction structure: read_acc_s, rd, imm

The read_acc_s instruction is an instruction for causing the processor 10 to shift the data of the accumulator register (40 bits) by imm bits, perform rounding and saturation, and store the data in the scalar register rd. The processor 10 acquires statistics of the accumulator register and accumulates the statistics in the statistics register.

Figure 27:
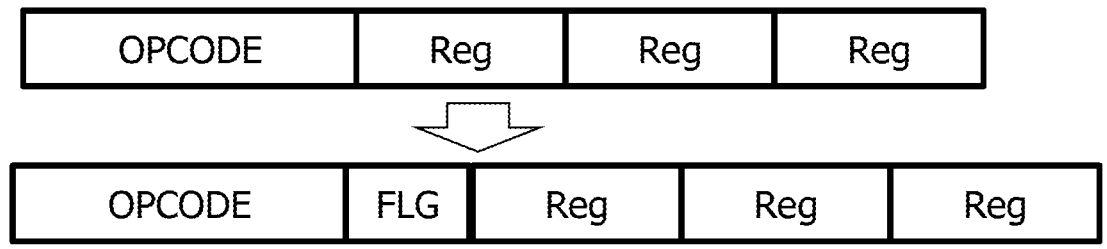
FIG. 27 is a diagram illustrating an instruction format.

(Modification of Method 1) In addition to the above-mentioned Method 1, a register index (s) for storing statistical information may be added to the operand of the instruction so that the storage destination of the statistical information can be specified. Hereinafter, the configuration of the instruction will be exemplified. The index (s) of this instruction specifies the index of the statistical information register file of FIG. 22, 25, 26, or the like.

vmul_s vs, vt, vd, imm, s vld_s ss, st, vd, s read_acc sd, imm, s (Method 2) An instruction format according to Method 2 is illustrated in FIG. 27. The instruction format may be expanded to add a bit specifying whether to acquire statistical information. For example, a statistical information acquisition function may be added to all instructions. FIG. 25 illustrates an expanded instruction format. As illustrated, FLG=1 specifies acquisition of statistical information. On the other hand, FLG=0 does not designate acquisition of statistical information, and indicates the same instruction as the conventional one.

Figure 28:
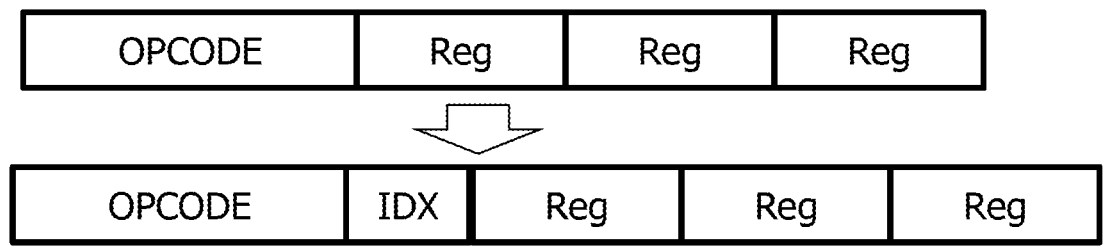
FIG. 28 is a diagram illustrating an instruction format.

(Variation of Method 2) FIG. 28 illustrates an instruction format according to a variation of method 2. The instruction format may be expanded to specify a register index for storing statistical information. In the figure, IDX indicates a register index (index of FIG. 22, FIG. 25, FIG. 26, or the like). However, when IDX=000, the processor 10 does not acquire statistical information. The decoder 112 in FIG. 9 that decodes the instruction format in FIG. 28 and acquires the register index IDX is an example of a decoder that acquires designation of a storage destination of statistical information.

In order for the information processing device 1 to execute the instruction with the statistical information acquisition function as described above, the instruction with the statistical information acquisition function may be executed by a dedicated subroutine. When compiling a dedicated subroutine, the compiler may incorporate an instruction with a statistical information acquisition function into an execution form. Also, the dedicated subroutine may be written in assembly language, and the execution of the instruction with an acquisition function may be specified statistically. In the computer program for causing the information processing device 1 to perform deep training, the dedicated subroutine as described above may be called.

<Execution Procedure>

Figure 29:
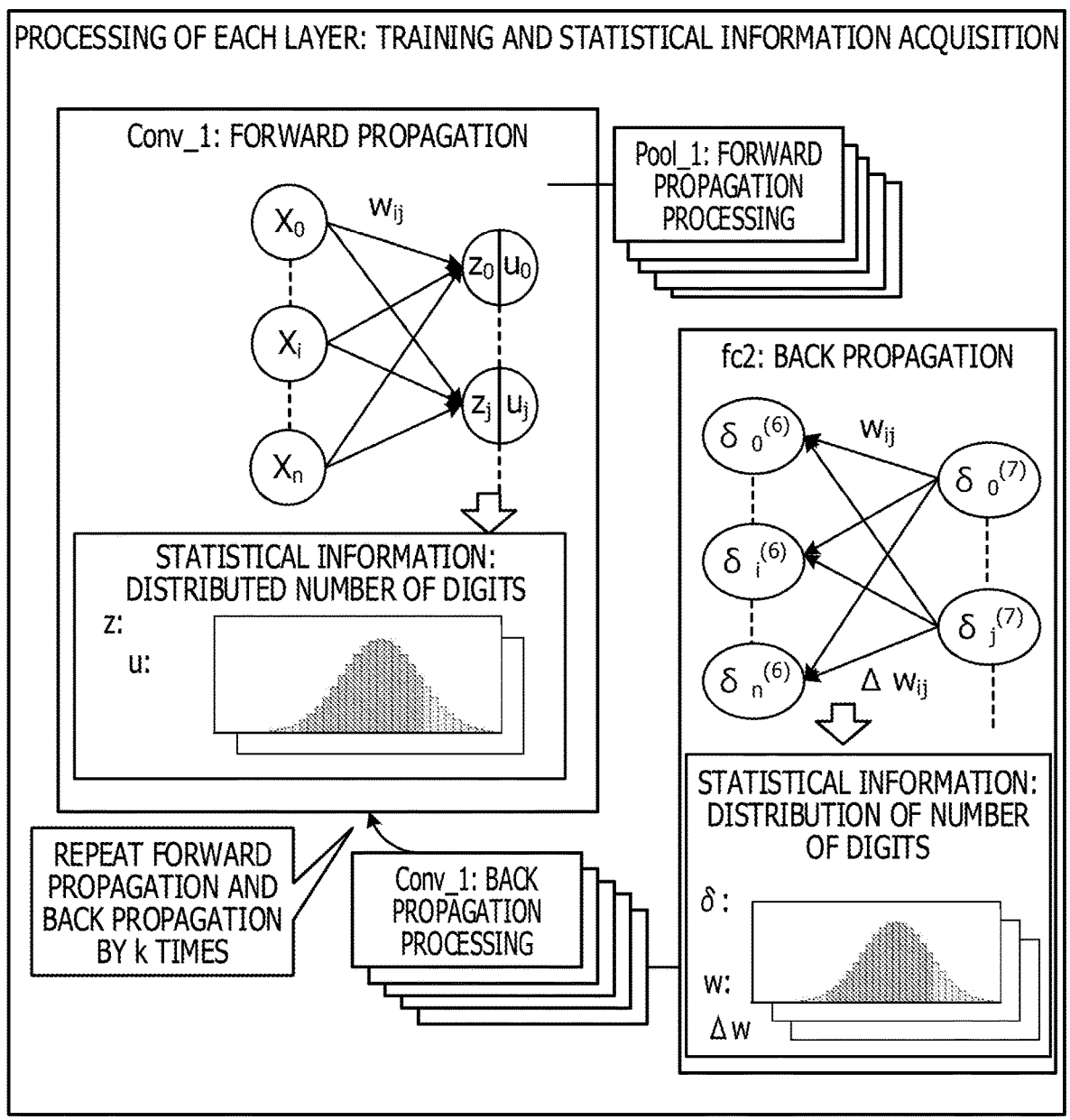
FIG. 29 is a diagram illustrating the details of processing of each layer when the information processing device performs deep training.

FIG. 29 illustrates details of processing of each layer when the information processing device 1 according to the present embodiment performs deep training. The information processing device 1 that executes the processing of FIG. 29 is an example of the information processing device that executes deep training by operation in one or more layers. In the drawing, a first convolution layer (Conv_1), a pooling layer (Pool_1), and a fully connected layer 2 (fc2) are illustrated. Also in this example, as in FIG. 6 of the comparative example, in the first convolution layer (Conv_1), the convolution operation is performed between the input data ini=(x0, . . . , xn) and the weight (Wij) Is executed and z0, . . . , zj, . . . or the like is calculated. Further, activation functions are operated for z0, . . . , zj, . . . or the like, and u0, . . . , uj, . . . or the like are calculated. The information processing device 1 performs statistics on variables z0, . . . , zj, or the like in the first convolution layer (Conv_1).

Information is stored in the statistics register file specified by the internal statistics register or register index. If the statistics information register or the register file is insufficient, the statistics information is saved in the memory after the computation of each layer is completed, and the statistics information is restored before the start of the next computation. Similarly, the information processing device 1 accumulates statistical information in variables u0, . . . , uj, . . . or the like in the first convolution layer (Conv_1) in an internal register or a statistical information register file specified with the register index. The statistical information of this embodiment is different from the number of times of overflow as in the comparative example, and as described above, (1) distribution of the most significant bit position which is non-sign, (2) distribution of the least significant bit position which is non-sign, (3) the maximum value of the most significant bit position that is not a sign, (4) the minimum value of the least significant bit position that is not a sign, or any combination of two or more of them.

The operation result in the first convolution layer (Conv_1) is further propagated from the first pooling layer (Pool_1) to the upper layer. At this time, the information processing device 1 executes the same operation and accumulation of statistical information in the second and higher layers. Then, the information processing device 1 calculates variables of errors $\delta 0^{(7)}, \ldots, \delta j^{(7)}, \ldots$ from the difference value between the operation result obtained and the correct data Ti after the fully connected layer 2 (fc2). Then, the information processing device 1 performs propagation processing in the back direction based on the variables of the errors $\delta 0^{(7)}, \ldots, \delta j^{(7)}, \ldots$. That is, the information processing device 1 calculates the difference value $\Delta Wij$ to the next weight between a variable of errors $\delta 0^{(6)}, \ldots, \delta j^{(6)}, \ldots \delta n^{(6)}$ at the output of the lower layer (for example, the connected layer 1(fc1)) and the variable Wij of the weight. At this time, the information processing device 1 accumulates error variables $\delta 0^{(7)}, \delta j^{(7)}, \ldots$ and error variables $\delta 0^{(6)}, \ldots, \delta j^{(6)}, \ldots, \delta n^{(6)}$ similarly to the first convolution layer (Conv_1). The information processing device 1 also accumulates statistical information on the difference value $\Delta Wij$. In addition, the information processing device 1 accumulates statistical information in the variable Wij of the weight.

Then, the information processing device 1 calculates the difference in weight while propagating the error in the reverse method from the fully connected layer 2 (fc2) to the first convolution layer (Conv_1). The information processing device 1 repeats k times of forward propagation and back propagation as described above using k sets of input data. The information processing device 1 updates the fixed point position of each variable based on the statistical information of each variable after the k times of mini-batch ends.

Figure 30:
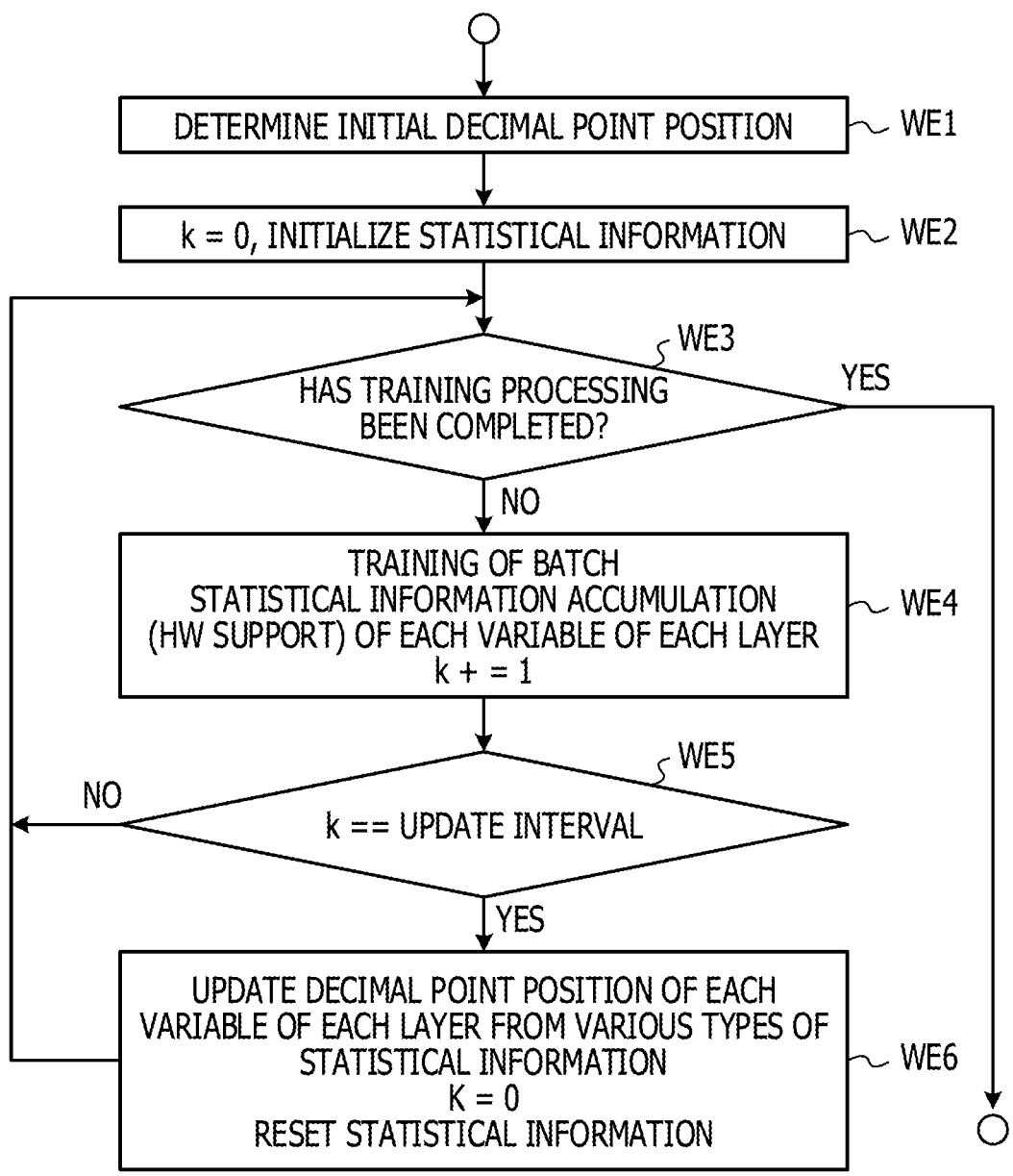
FIG. 30 is a diagram illustrating a flowchart of training processing by the information processing device.

FIG. 30 illustrates a flowchart of training processing by the information processing device 1 of the present embodiment. In this process, the information processing device 1 determines an initial decimal point position (WE1). The information processing device 1 may determine the initial decimal point position of each variable by past experimental values, actual values, or user specification.

Then, the information processing device 1 initializes the number k to zero. Further, the information processing device 1 initializes a variable storing statistical information in a program (WE2). Then, the information processing device 1 determines whether the condition for the end of training is satisfied (WE3). The training ends when the error in all the coupled layers (fc2) falls below a reference value or when the number of trainings reaches a prescribed maximum value.

If the condition for training termination is not satisfied, the information processing device 1 executes the next mini-batch. At this time, the information processing device 1 accumulates statistical information of each variable of each layer in a statistical information register or a statistical information register file. Accumulating statistical information is implemented in the hardware of the processor 10, as described above. Then, the information processing device 1 counts up the variable k (WE4).

Then, the information processing device 1 determines whether the number k has reached the update interval (WE5). If the number k has not reached the update interval, the information processing device 1 returns to the processing of WE3. On the other hand, when the number of times k reaches the update interval, the information processing device 1 reads out statistical information in which various types of statistical information are accumulated from the statistical information register or the statistical information register file or reads out the statistical information from the region where the statistical information is evacuated in the memory. Then, the information processing device 1 updates the decimal point position of each variable of each layer based on the read statistical information (WE6).

At this time, the information processing device 1 may determine the decimal point position, for example, such that the ratio of the data to be saturated to the total number of data to be underflowed satisfies the target condition. Further, when it is difficult for both the ratio of saturated data to the total data and the ratio of underflowed data to the total data to satisfy the target condition, the information processing device 1 may give priority to one of them. In addition, the information processing device 1 may set the decimal point position by positioning the center of the range that can be expressed by fixed-point numbers, with the average of the upper limit bit position where saturation does not occur and the lower limit bit position where valid data exists. Further, the information processing device 1 initializes the number k to 0, and further resets a register storing statistical information. Then, the information processing device 1 returns to the process of C3.

The accumulation of the statistical information of each variable of each layer in WE4 and the reading of the statistical information from the register or register file in which various types of statistical information are accumulated in WE6 are examples of acquiring statistical information on the distribution of bits in fixed point number data at the time of execution of an instruction including an instruction of the operation in at least one layer of one or more layers. In WE6, updating the decimal point position of each variable of each layer based on the read statistical information is an example of updating the decimal point position of fixed point number data based on statistical information on the distribution of bits.

Figure 31:
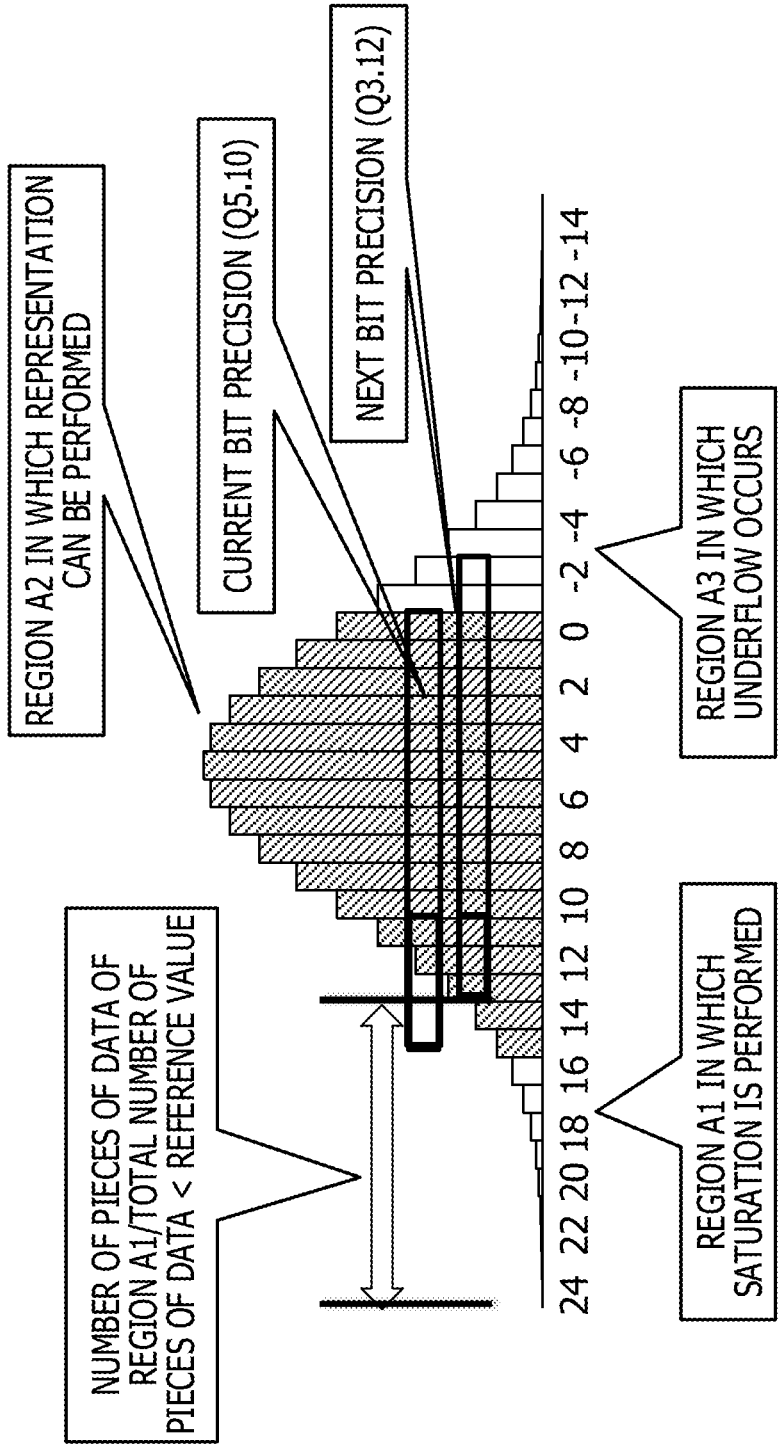
FIG. 31 is an example of updating a decimal point position when data does not fall within a fixed point number range.

FIG. 31 illustrates an example of the decimal point position update when the data does not fall within the fixed point range. The figure illustrates, for example, the distribution of the positions of the most significant bits that are not signs. Now, it is assumed that a fixed-point number is described in Q5.10 (five digits of integer part, ten digits after the decimal point), and a region A1 in which saturation is performed, a region A2 in which representation can be performed, and a region A3 in which an underflow occurs are formed. In this example, the region A1 in which saturation is performed and the region A3 in which underflow occurs are illustrated by the white frequency distribution. Further, the expressible regions are indicated by hatching patterns of diagonal lines. Further, in this example, the frequency distribution in the region where the underflow occurs is higher than the frequency distribution in the region where the saturation is saturated, and the balance is poor. On the other hand, even if the decimal point position is moved downward by 2 bits and Q3.12 (three integer part digits, twelve digits after the decimal point), the value obtained by dividing the number of data in the region in which saturation is performed by the total number of data is less than the target reference value. Therefore, the information processing device 1 may reset the decimal point position from Q5.10 to Q3.12 and continue deep training.

Figure 32:
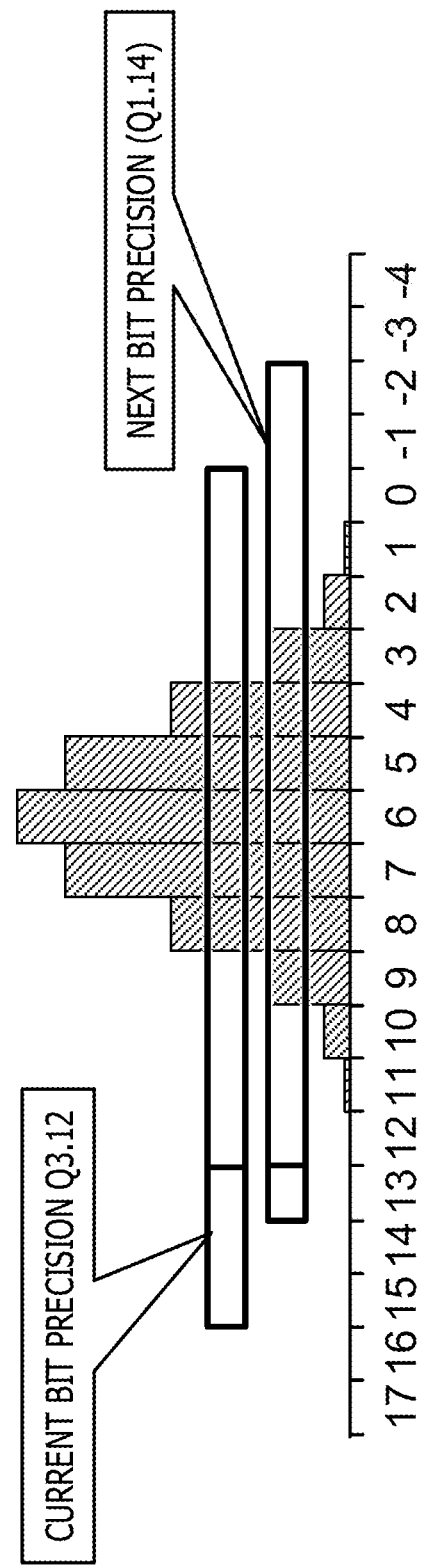
FIG. 32 is an example of updating a decimal point position when data falls within a fixed point number range.
Figure 33:
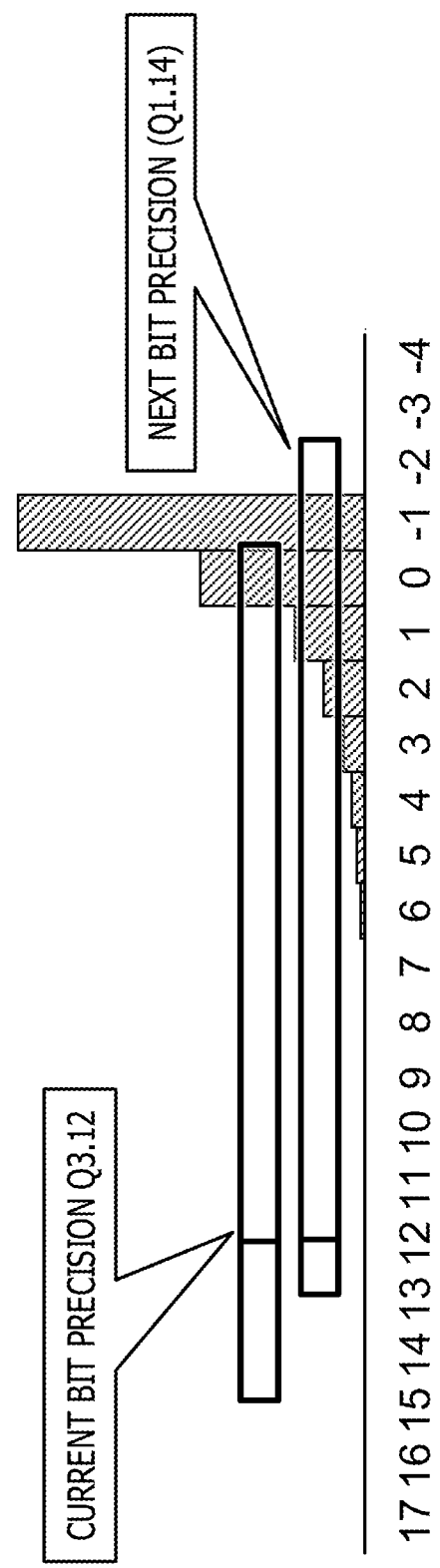
FIG. 33 is distribution of the least significant bit which is not a sign.

FIG. 32 and FIG. 33 illustrate an example of the decimal point position update when the data falls within the fixed point range. Similarly to FIG. 31, FIG. 32 also illustrates, for example, the distribution of the most significant bit position that is not a sign. Further, FIG. 33 illustrates the distribution of the least significant bit that is not a sign. In FIG. 32, the data of the variable falls within the range that can be expressed with the current bit precision (Q3.12 format). However, in FIG. 33, it can be seen that there are valid values up to the −1st bit, and these values are rounded. Therefore, the information processing device 1 has the 11th bit of the maximum value in which the number of data is 1 or more in the most significant bit position distribution and the 1st bit of the minimum value in which the number of data is 1 or more in the distribution of the least significant bit. Then, the decimal point position may be reset from Q3.12 to Q1.14 so as to be at the center of the expressible range, and deep training may be continued.

Effect of the Embodiment

The information processing device 1 accumulates, in a register or a register file, statistical information of each variable of each layer when executing a deep training mini-batch. Then, the information processing device 1 can update the decimal point position of each variable of each layer based on the accumulated statistical information. That is, the processor 10 acquires statistical information on bit distribution. Here, statistical information is (1) distribution of the most significant bit position which becomes non-sign at the time of instruction execution, (2) distribution of the least significant bit position which becomes non-sign, (3) most significant bit position which becomes non-sign, (4) the minimum value of the least significant bit position that is not signed, or a combination of these. Therefore, when the information processing device 1 executes deep training, the overhead in the deep training program for acquiring statistical information of data is eliminated, so that dynamic fixed-point operation can be realized in a practical time.

That is, in the present embodiment, the processor 10 of the information processing device 1 executes the instruction with the statistical information acquisition function, bit shifts the operation result, rounds/saturates, and executes the instruction stored in the register. Therefore, the information processing device 1 can reduce the overhead of acquiring statistical information indicating the bit distribution. Also, it is possible to immediately determine the appropriate bit shift, that is, the decimal point position from the statistical information indicating the bit distribution. That is, as in the information processing device 1, the decimal point position can be immediately determined from the statistical information indicating the bit distribution, not the procedure in which the appropriate decimal point position is tried with one bit shifted at a time and the result is confirmed in the next operation (FIG. 31 and FIG. 32). Therefore, the information processing device 1 is unlikely to repeat the training processing in a state in which the decimal point position is inappropriate as in the comparative example. Further, the information processing device 1 is less likely to lead to the precision deterioration of the training result and to the delay in the convergence of deep training.

In addition, since the information processing device 1 can execute deep training with high precision using fixed-point numbers, it is possible to reduce the amount of data transfer and the circuit size of the computing unit. As a result, the information processing device 1 can reduce power consumption. The circuit size that can be reduced can be estimated as follows. For example, when the circuit that executes 32-bit floating-point operation is limited to a circuit that executes 16-bit fixed-point operation, the amount of data (memory and data transfer amount) is halved. In addition, as the operation circuit scale, the circuit scale in product-sum operation is about half (estimated with FPGA).

Further, the processor 10 can obtain the position of the most significant bit which does not match the sign bit in the fixed point number data occur after the instruction execution by the statistical information acquisition unit 102A. Further, the processor 10 can accumulate and count the position of the most significant bit which does not match the sign bit by the statistical information aggregation unit 104A with respect to the plurality of fixed point number data occur. In addition, the processor 10 accumulates a bit string indicating the position of the most significant bit that does not match the sign bit as a true value by logical sum operation on the plurality of pieces of fixed point number data occur by the statistical information aggregation unit 104B and the statistical information storage unit 105C (or 105E). Then, the processor 10 can obtain the position of the highest true value in the accumulated bit string.

Also, the processor 10 can obtain the position of the least significant bit which does not match the sign bit in the fixed point number data occur after the instruction execution by the statistical information acquisition unit 102B. Also, the processor 10 can accumulate and count the position of the least significant bit that does not match the sign bit with respect to the plurality of fixed point number data occur by the statistical information aggregation unit 104A. In addition, the processor 10 accumulates a bit string indicating the position of the least significant bit that does not match the sign bit as a true value for the plurality of pieces of fixed point number data occur by logical sum operation by the statistical information aggregation unit 104B and the statistical information storage unit 105D (or 105F). Then, the processor 10 can obtain the position of the lowest true value in the accumulated bit string. With the above configuration, the processor 10 can acquire the statistical information.

Regarding Information Processing Device of the Present Embodiment

The information processing device 1 includes a processor 10, an instruction memory 21, and a data memory 22. The information processing device 1 executes deep training in accordance with a computer program expanded in an executable manner in the instruction memory 21. The processor 10 is also called a central processing unit (CPU) or a microprocessor (MPU). The processor 10 is not limited to a single processor, and may be a multiprocessor configuration. Also, a single processor 10 connected by a single socket may have a multi-core configuration. At least a part of processing of the information processing device 1 that executes deep training may be performed by a device other than the processor 10, for example, a dedicated processor such as a digital signal processor (DSP), a graphics processing unit (GPU), a numerical operation processor, a vector processor, an image processing processor, or the like. Further, at least a part of the processing of the information processing device 1 that executes deep training may be an integrated circuit (IC) or another digital circuit. In addition, an analog circuit may be included in at least a part of the information processing device 1 that executes deep training. The integrated circuit includes an LSI, an application specific integrated circuit (ASIC), and a programmable logic device (PLD). The PLD includes, for example, a field-programmable gate array (FPGA). Each of the units described above may be a combination of a processor and an integrated circuit. The combination is called, for example, a microcontroller (MCU), a SoC (System-on-a-chip), a system LSI, a chipset, or the like.

<Recording Medium>

A program that causes a computer or other machine or device (hereinafter referred to as a computer or the like) to realize any of the functions described above can be recorded in a recording medium readable by the computer or the like. Then, the function can be provided by causing a computer or the like to read and execute the program of the recording medium.

Here, a recording medium readable by a computer or the like is a recording medium which can store information such as data and programs electrically, magnetically, optically, mechanically, or chemically and read from a computer or the like. Among such recording media, those removable from a computer or the like are, for example, flexible disks, magneto-optical disks, Compact Disc (CD)-Read Only Memory (ROM), CD-Recordable (R), Digital Versatile Disk (DVD), Blu-ray Disc, Digital Audio Tape (DAT), 8 mm tape, and memory cards such as flash memory. Further, as a recording medium fixed to a computer or the like, there are a hard disk, a ROM (Read Only Memory), and the like. Furthermore, Solid State Drive (SSD) can be used as a recording medium removable from a computer or the like, and also as a recording medium fixed to the computer or the like.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An operation processing device comprising:
a memory; and
a processor coupled to the memory and configured to:
acquire statistical information on distribution of bits in fixed point number data after execution of an instruction on the fixed point number data;
update a decimal point position of the fixed point number data; and
acquire a position of a most significant bit or a least significant bit that does not match a sign bit in the fixed point number data after execution of the instruction.

2. The operation processing device according to claim 1, wherein the processor accumulates and counts the position with respect to a plurality of pieces of the fixedpoint number data.

3. The operation processing device according to claim 1, wherein the processor accumulates a bit string indicating the position as a true value by logical sum operation on a plurality of pieces of the fixed point number data, and acquires a position of a most significant true value in the bit string accumulated.

4. The operation processing device according to claim 1, wherein the processor acquires designation of a storage destination of the statistical information from the instruction.

5. The operation processing device according to claim 4, wherein the processor acquires designation of the decimal point position of the fixed point number data from the instruction.

6. An information processing device comprising:
a memory; and
a processor coupled to the memory and configured to:
perform deep training by operation in one or more layers;
acquire statistical information on distribution of bits in fixed point number data during execution of an instruction including an instruction of the operation in at least one layer of the one or more layers;
update a decimal point position of the fixed point number data based on the statistical information on the distribution of the bits; and
acquire a position of a most significant bit or a least significant bit that does not match a sign bit in the fixed point number data after execution of the instruction.

7. The information processing device according to claim 6, wherein the processor acquires designation of a storage destination of the statistical information from the instruction.

8. An information processing method comprising:
performing, by a computer, deep training by operation in one or more layers;
acquiring statistical information on distribution of bits in fixed point number data during execution of an instruction including an instruction of the operation in at least one layer of the one or more layers;
updating a decimal point position of the fixed point number data based on the statistical information on the distribution of the bits; and
acquiring a position of a most significant bit or a least significant bit that does not match a sign bit in the fixed point number data after execution of the instruction.

9. The information processing method according to claim 8, further comprising: acquiring designation of a storage destination of the statistical information from the instruction.

* * * * *